(12) United States Patent
Tada et al.

(10) Patent No.: US 10,564,460 B2
(45) Date of Patent: Feb. 18, 2020

(54) DISPLAY DEVICE WITH POSITION INPUTTING FUNCTION

(71) Applicant: Sharp Kabushiki Kaisha, Sakai, Osaka (JP)

(72) Inventors: Kenshi Tada, Sakai (JP); Hiroyuki Ogawa, Sakai (JP); Kazutoshi Kida, Sakai (JP); Shinji Yamagishi, Sakai (JP); Takenori Maruyama, Sakai (JP); Jean Mugiraneza, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 292 days.

(21) Appl. No.: 15/529,364

(22) PCT Filed: Nov. 20, 2015

(86) PCT No.: PCT/JP2015/082670
§ 371 (c)(1),
(2) Date: May 24, 2017

(87) PCT Pub. No.: WO2016/084733
PCT Pub. Date: Jun. 2, 2016

(65) Prior Publication Data
US 2018/0321530 A1    Nov. 8, 2018

(30) Foreign Application Priority Data

Nov. 28, 2014 (JP) .................................. 2014-241324
Jul. 7, 2015 (JP) .................................. 2015-135943

(51) Int. Cl.
*G06F 3/044* (2006.01)
*G02F 1/1333* (2006.01)
(Continued)

(52) U.S. Cl.
CPC ...... *G02F 1/13338* (2013.01); *G02F 1/13394* (2013.01); *G02F 1/13439* (2013.01);
(Continued)

(58) Field of Classification Search
CPC ........... G02F 1/13338; G02F 1/133308; G02F 1/133512; G02F 1/133514; G02F 1/13394;
(Continued)

(56) References Cited

U.S. PATENT DOCUMENTS

2009/0244021 A1* 10/2009 Matsuo .................. G06F 3/044
345/173
2010/0149117 A1* 6/2010 Chien .................. G06F 3/0412
345/173

(Continued)

FOREIGN PATENT DOCUMENTS

JP    2010-218542 A    9/2010
JP    2013-231894 A    11/2013
(Continued)

*Primary Examiner* — Lunyi Lao
*Assistant Examiner* — Jarurat Suteerawongsa
(74) *Attorney, Agent, or Firm* — ScienBiziP, P.C.

(57) ABSTRACT

A liquid crystal display device includes an array board, a CF board, detection electrodes, drive electrodes, and position detection lines. The array board includes TFTs in a display area and a display circuit that includes at least monolithic circuits in a non-display area. The CF board is opposed to the array board with a gap. The detection electrodes are arranged on an outer surface of the CF board in the display area to extend along the first direction. The drive electrodes are arranged on an inner surface of the CF board in the display area to extend along the second direction. The position detection lines are arranged on the inner surface of the CF board in the non-display area for transmitting signals
(Continued)

to the drive electrodes. The position detection lines are arranged to overlap the monolithic circuits.

15 Claims, 24 Drawing Sheets

(51) Int. Cl.
*G06F 3/041* (2006.01)
*G02F 1/1335* (2006.01)
*G02F 1/1339* (2006.01)
*G02F 1/1343* (2006.01)
*G02F 1/1345* (2006.01)
*G02F 1/1362* (2006.01)

(52) U.S. Cl.
CPC .... *G02F 1/13454* (2013.01); *G02F 1/133308* (2013.01); *G02F 1/133512* (2013.01); *G02F 1/133514* (2013.01); *G02F 1/136286* (2013.01); *G06F 3/041* (2013.01); *G06F 3/044* (2013.01); *G06F 3/0412* (2013.01); *G06F 3/0416* (2013.01); *G02F 2001/133311* (2013.01); *G02F 2201/123* (2013.01); *G06F 2203/04103* (2013.01)

(58) Field of Classification Search
CPC ............ G02F 1/13439; G02F 1/13454; G02F 1/136286; G06F 3/041; G06F 3/0412; G06F 3/0416; G06F 3/044; G06F 2001/133311; G06F 2201/123; G06F 2203/04103
See application file for complete search history.

(56) References Cited

U.S. PATENT DOCUMENTS

| | | | |
|---|---|---|---|
| 2010/0220071 A1* | 9/2010 | Nishihara | G06F 3/0416 345/173 |
| 2011/0128246 A1* | 6/2011 | Esaka | G06F 3/044 345/173 |
| 2013/0293791 A1* | 11/2013 | Abe | G06F 3/0418 349/12 |
| 2013/0328757 A1 | 12/2013 | Matsumoto et al. | |
| 2014/0152613 A1* | 6/2014 | Ishizaki | G06F 3/0412 345/174 |
| 2014/0293159 A1* | 10/2014 | Adachi | G06F 3/0412 349/12 |
| 2015/0070305 A1* | 3/2015 | Seo | G06F 3/0412 345/174 |
| 2015/0362778 A1 | 12/2015 | Abe et al. | |
| 2016/0266714 A1 | 9/2016 | Matsumoto et al. | |

FOREIGN PATENT DOCUMENTS

| | | |
|---|---|---|
| JP | 2013-254142 A | 12/2013 |
| TW | 201441906 A | 11/2014 |

\* cited by examiner

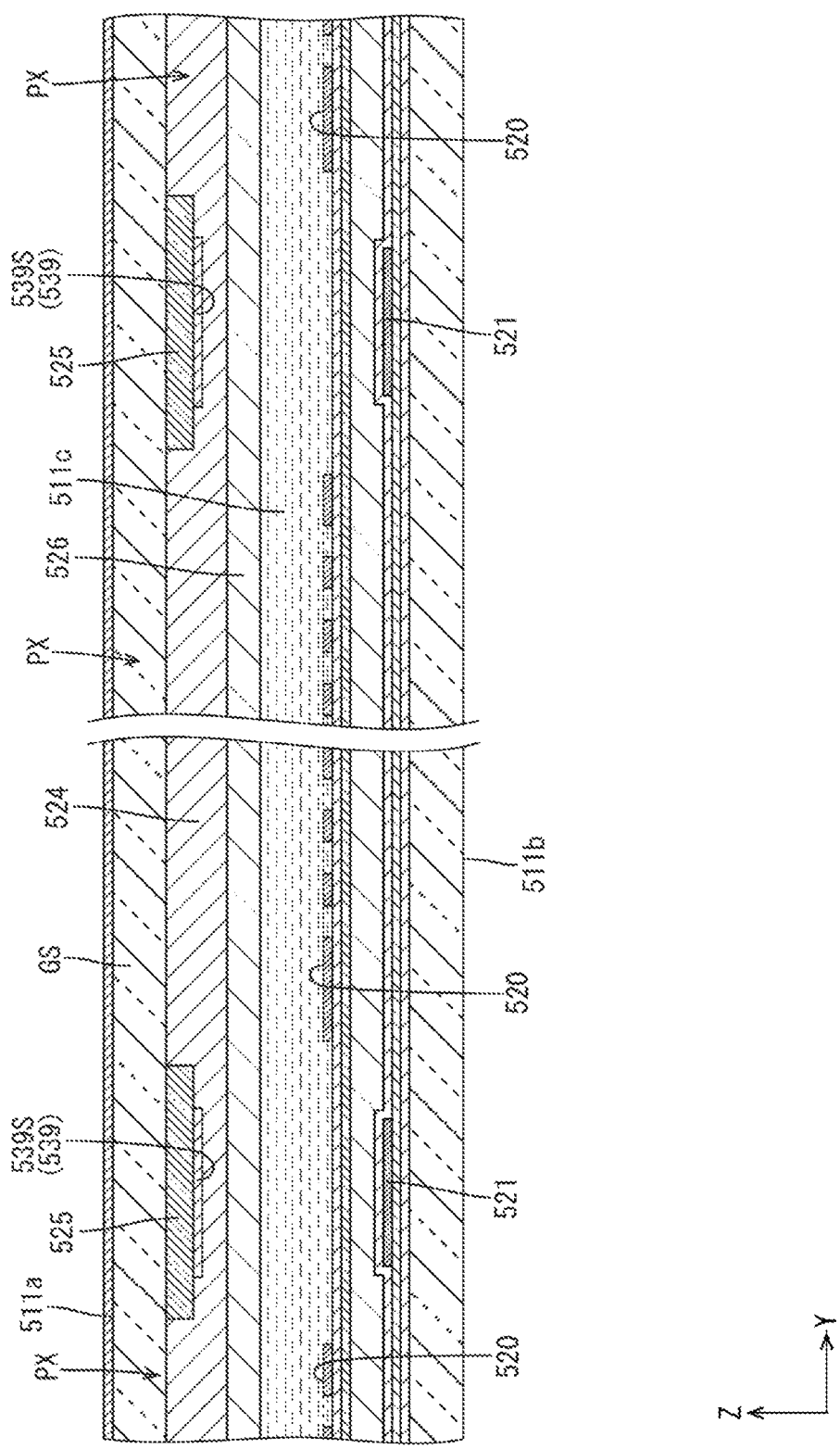

DISPLAY DEVICE WITH POSITION INPUTTING FUNCTION

TECHNICAL FIELD

The present invention relates to a display device with a position inputting function.

BACKGROUND ART

In recent years, more and more electronic devices such as tablet personal computers and portable digital assistants include touchscreens to improve operability and usability. A user can enter information on a position on a display surface of the liquid crystal panel by touching the display surface of the liquid crystal panel with a finger or a stylus. According to this configuration, the user can perform intuitive operation, that is, the user can perform operation with direct feeling as if he or she directly touches an image displayed on the liquid crystal panel. A display panel including such a position inputting function of the touchscreen is disclosed in Patent Document 1.

Patent Document 1 discloses a liquid crystal display device that includes an integrated touchscreen. The liquid crystal display device includes pixel electrodes and common electrodes that generate electrical fields for driving liquid crystals. The common electrodes are used for position detection. Capacitances between the common electrodes and detection electrodes may be different depending on whether or not an obstacle to interrupt the electric fields is present. Whether or not touching operation is performed is determined based on whether a difference in capacitance is present.

RELATED ART DOCUMENT

Patent Document

Patent Document 1: Unexamined Japanese Patent Application Publication No. 2013-231894

Problem to be Solved by the Invention

In Patent Document 1, the common electrodes that are included in a display circuit for displaying images are used for position detection. Therefore, the common electrodes are arranged closer to other lines (scanning lines, signal lines) which included in the display circuit. Interference is more likely to occur between the other lines and the common electrodes and signals for position detection are more likely to become dull. Furthermore, a period for image display and a period for position detection need to be chronologically shifted from each other. This may shorten the period for image display and the period for position detection and adversely affect display performance and position detection performance. The period for image display and the period for position detection tend to be further shortened as definition or a screen size increases. This has been an unsolved problem.

DISCLOSURE OF THE PRESENT INVENTION

The present invention was made in view of the above circumstances. An object is to restrict a reduction in position detection performance.

Means for Solving the Problem

A display device with a position inputting function includes an array board, a common board, first position detection electrodes, second position detection electrodes, and position detection line portions. The array board includes display components arranged in a display area for displaying an image and a display circuit arranged in a non-display area in which no image is displayed. The display circuit includes at least component drivers for driving display components. The common board is opposed to the array board with a gap between the common board and the array board. The first position detection electrodes are arranged on a plate surface of the common board facing away from the array board in the display area. The first position detection electrode extends along a first direction. The second position detection electrodes are arranged on a plate surface of the common board facing the array board in the display area. The second position detection electrodes extend along the plate surface and a second direction perpendicular to the first direction. The position detection line portions are arranged on the plate surface of the common board facing the array board in the non-display area. The position detection line portions are connected to the second position detection electrodes for transmitting signals to the second position detection electrodes. The position detection line portions are arranged to overlap the component driver.

According to the configuration, image display is performed with the display components and the components driver included in the display circuit of the array board. The first position detection electrodes are arranged on the plate surface of the common board facing away from the array board that is opposed to the common board with the gap in the display area. The second position detection electrodes are arranged on the plate surface of the common board facing the array board in the display area to extend along the second direction perpendicular to the first direction. The position detection line portions are arranged on the plate surface of the common board facing the array board in the non-display area. The position detection line portions are connected to the second position detection electrodes for transmitting the signals to the second position detection electrodes. According to the configuration, an input position of a user can be detected based on a variation in capacitance between the first position detection electrodes and the second position detection electrodes.

The second position detection electrodes are arranged on the plate surface of the common board facing the array board that is opposed to the common board with the gap and including the display circuit. In comparison to a configuration in which the second position detection electrodes are arranged on the array board, the second position detection electrodes are located farther from the display circuit. According to the configuration, interference is less likely to occur between the display circuit and the second position detection electrodes and thus the signals for the position detection are less likely to become dull. If components in the display circuit of the array board are used as the second position detection electrodes, a display period and a position detection period need to be chronologically shifted from each other. Because the second position detection electrodes of the common board are independent from the display circuit, the display period and the position detection period can chronologically overlap each other. Therefore, the display period and the position detection period can be set longer. This configuration is preferable for increasing definition and the screen size. Furthermore, the position detection line portions are arranged to overlap the component drivers. Therefore, even if noise is generated by the component drivers, the noise can be blocked by the position detection lines. According to the configuration, position detection performance is less likely to decrease.

Preferred embodiments of the position inputting device according to the present invention may include the following configurations.

(1) The component drivers may be arranged to sandwich the second position electrodes with respect to the second direction. The position detection line portions may include position detection lines connected to first ends of the second position detection electrodes with respect to the second direction and arranged to overlap a first component driver of the component drivers. The display device may further include dummy lines arranged on the plate surface of the common board facing the array board in the non-display area. The dummy lines may be connected to second ends of the second position detection electrodes with respect to the second direction and arranged to overlap a second component driver of the component drivers. In this configuration, the position detection line portions include the position detection lines connected to the first ends of the second position detection electrodes with respect to the second direction and arranged to overlap the first component driver. According to the configuration, the first component driver is shielded. Some of the dummy lines are connected to the second ends of the second position detection electrodes which are not connected to the position detection lines. The dummy lines are arranged to overlap the second component driver. According to the configuration, the second component driver is shielded. The component drivers arranged to sandwich the second position detection electrodes with respect to the second direction are shielded. Furthermore, electrical performance (continuity) of the second position detection electrodes can be inspected using the dummy lines.

(2) The display device may further include a protective film that covers the second position detection electrodes, the position detection line portions, and the dummy lines from an array board side. The protective film may include holes at position overlapping the dummy lines. According to the configuration, the second position detection electrodes, the position detection line portions, and the dummy lines are protected with the protective film. The dummy lines can contact an inspection apparatus through the holes in the protective film at the positions overlapping the dummy lines. According to the configuration, inspection of the second position detection electrodes can be performed after the protective film is formed in the production.

(3) The second position detection electrodes may be arranged along the first direction. The position detection line portion detection line portions may include position detection lines that are connected to the first ends of the second position detection electrodes and arranged to overlap the first component driver and position detection lines that are connected to the second ends of the second position detection electrodes an arranged to overlap the second component driver. Some of the dummy lines may be connected to the second ends of the second position detection electrodes and arranged to overlap the second component driver and some of the dummy lines may be connected to the first ends of the second position detection electrodes and arranged to overlap the first component driver. In this configuration, the second position detection electrodes arranged along the first direction include the second position detection electrodes including the first ends to which the position detection lines are connected and the second position detection electrodes including the second ends to which the position detection lines are connected. In comparison to a configuration in which the position detection lines are connected to the first ends of all of the second position detection electrodes, a larger space can be provided for each position detection lines. Therefore, each position detection line has a larger width and thus higher sensitivity can be achieved in the position detection. The position detection lines connected to the first ends of the second position detection electrodes and the dummy lines connected to the first ends of the second position detection electrodes are arranged to overlap the first component driver. The position detection lines connected to the second ends of the second position detection electrodes and the dummy lines connected to the second ends of the second position detection electrodes are arranged to overlap the second component driver. Therefore, the component drivers are properly shielded.

(4) The display device may further include pixel portions each exhibiting different colors and a light blocking portion for separating the pixel portions from one another. The first position detection electrodes may be formed from a transparent electrode film. The second position detection electrodes may be formed from at least a metal film and arranged to overlap sections of the light blocking portion. Because the second position detection electrodes are formed from at least the metal film, resistances of the second position detection electrodes are sufficiently low. Furthermore, the second position detection electrodes formed from the metal film are arranged to overlap the sections of the light blocking portion that separates the pixel portions from one another in the display area. Therefore, the second position detection electrodes are less likely to adversely affect the image display in the display area. The first position detection electrodes are formed from the transparent electrode film and thus less likely to adversely affect the image display in the display area.

(5) The light blocking portion may include sections extending along the first direction and sections extending along the second direction to form a grid pattern. The second position detection electrodes may include second position detection electrode segments arranged along the first direction at intervals corresponding to dimensions of the pixel portions. The second position detection electrode segments may be arranged to overlap the sections of the light blocking portion extending along the second direction. In this configuration, the second position detection electrode segments extending along the second direction are arranged at intervals along the first direction to overlap the sections of the light blocking portion, which is formed in the grid pattern, extending along the second direction. Therefore, the wire resistances of the second position detection electrodes are properly reduced without reducing the aperture rate of the pixel portions and thus the image display is less likely to receive adverse effects.

(6) The pixel portions may include pixel electrodes and color filters. The pixel electrodes may be arranged on the array board in the display area and connected to the display components. The color filters may include color portions arranged on the common board in the display area to overlap the pixel electrodes and each exhibit different colors. The color filters may be arranged such that the color portions extend along the first direction, cross the sections of the light blocking portion extending along the second direction, and overlap the second position detection electrode segments on the array board side. Because the color portions of the color filters are arranged to overlap the second position detection electrode segments arranged to overlap the light blocking portion, steps that may be produced on the surface of the common board on the array board side by forming the second position detection electrode segments can be reduced. This configuration is preferable for planarization of the surface of the common board. In comparison to a configuration in which the color portions of the color filters are arranged only in areas defined by the light blocking portion formed in the grid pattern, distances between the second position detection electrode segments arranged to overlap the sections of the light blocking portion extending along the second direction and the pixel electrodes arranged on the array board in the display area and connected to the display components are larger. Therefore, parasitic capacitances between the second position detection electrode segments and the pixel electrodes decrease. According to the configuration, the sensitivity in the position detection improves. Further in this configuration, the color portions of the color filters extend along the first direction. In comparison to a configuration in which the color portions of the color filters are arranged only in the areas defined by the light blocking portion formed in the grid pattern, it is not necessary to divide the color portions into small segments. Therefore, the color portions can be easily formed by patterning. This configuration is preferable for increasing the definition.

The second position detection electrodes may be arranged to overlap the light blocking portion on the array board side. According to the configuration, ambient light that has entered from the common board side is blocked by the light blocking portion before reaching the second position detection electrodes. Therefore, the second position detection electrodes are less likely to reflect the ambient light and thus the reflected light is less likely to be recognized. This configuration provides high display quality.

(8) The second position detection electrodes may be arranged to overlap the light blocking portion on a common board side. In comparison to a configuration in which the second position detection electrodes are arranged to overlap the light blocking portion on the array board side, a base on which the second position detection electrodes area formed is more planar. According to the configuration, high accuracy can be achieved in forming the second position detection electrodes by patterning.

Each of the second position detection electrodes may have a multilayer structure of the metal film and a transparent electrode film that is formed over the metal film. The ambient light that has entered from the common board directly reaches the second position detection electrodes that are arranged to overlap the light blocking portion on the common board side. If the second position detection electrodes are formed only from the metal film, it is necessary to significantly reduce the width of the second position detection electrodes to reduce an amount of light reflected by the second position detection electrodes. As described above, each second position detection electrode has the multilayer structure of the metal film and the transparent electrode film. Because the transparent electrode film is less likely to cause such a reflected light problem, even if the width of the metal film is significantly reduced to reduce the amount of the reflected light, the amount of the reflected light can be reduced by providing the transparent electrode film with a large width. Furthermore, the second position detection electrodes have sufficient areas. With the second position detection electrodes with the sufficient areas, a sufficient level of the sensitivity can be achieved in the position detection.

(10) The position detection lines may include ends connected to at least the second position detection electrodes. Each of the ends may have a multilayer structure of the metal film and a transparent electrode film that is formed over the metal film. Even though the position detection lines are arranged in the non-display area, the ambient light that has entered from the common board side may reach the ends of the position detection lines connected to the second position detection electrodes and the reflected by the ends of the position detection lines. If so, the display quality may decrease. If the position detection lines are formed only from the metal film, it may be necessary to significantly reduce the widths of the position detection lines for the ends connected to at least the second position detection electrodes to reduce the amount of light reflected by the position detection lines. As described above, each of the ends connected to at least the second position detection electrodes has the multilayer structure of the metal film and the transparent electrode film. Because the transparent electrode film is less likely to cause such a reflected light problem, even if the width of the metal film is significantly reduced to reduce the amount of the reflected light, the amount of the reflected light can be reduced by providing the transparent electrode film with a large width. Furthermore, the second position detection electrodes have sufficient areas. With the second position detection electrodes with the sufficient areas, a sufficient level of the sensitivity can be achieved in the position detection.

(11) The display device may further include a holding member for holding the common board from a side opposite from the array board side. The holding member may be arranged to overlap at least an outer edge portion of the non-display area. The position detection lines may include sections that do not overlap the holding member and sections that overlap the holding member. Each of the sections that do not overlap the holding member has a multilayer structure of the metal film and the transparent electrode film. Each of the sections that overlap the holding member has a single layer structure of the metal film. According to the configuration, the ambient light that has entered from the common board side and travels toward the sections of the position detection lines which do not overlap the holding member is not blocked by the holding member. Therefore, by forming the sections in the multilayer structure of the metal film and the transparent electrode film, the amount of the reflected light is reduced and the sufficient areas of the position detection lines are achieved.

(12) The display device may further include spacers arranged between the array board and the common board to overlap the light blocking portion and the second position detection electrodes. The light blocking portion and the second position detection electrodes may include spacer non-arrangement sections in which no spacers are arranged and spacer arrangement sections in which the spacers are arranged. Each of the spacer arrangement sections has a width larger than a width of each of the spacer non-arrangement sections. Because each second position detection electrode has the spacer arrangement section having the width larger than the width of the spacer non-arrangement section, the second position detection electrodes have larger areas. According to the configuration, the sensitivity in the position detection increases. Furthermore, the width of the spacer arrangement section of the light blocking portion is larger than the width of the spacer non-arrangement section of the light blocking portion. The spacers are arranged in the spacer arrangement sections of the light blocking portion and the second position detection electrodes between the array board and the common board. Therefore, the spacer arrangement sections of the second position detection electrodes are less likely to adversely affect the image display in the display area.

(13) The second position detection electrodes may be arranged along the first direction. The position detection lines may be connected to the first ends of the second position detection electrodes and arranged along the second direction to extend along the first direction. The display device may further include signal applying portions in an edge portion of the plate surface of the common board facing the array board in the non-display area with respect to the first direction. The signal supplying portions may be connected to the position detection lines for supplying the signals. The position detection lines connected to the second position detection electrodes farther from the signal supplying portions with respect to the first direction have widths larger than widths of position detection lines connected to the second position detection electrodes closer to the signal supplying portions with respect to the first direction. In comparison to the position detection lines connected to the second position detection electrodes closer to the signal supplying portions with respect to the first direction, creepage distances of the position detection lines connected to the second position detection electrodes farther from the signal supply portions with respect to the first direction tend to be larger. By setting the widths larger, the wire resistances are less likely to increase. According to the configuration, a difference that may be produced between the position detection lines connected to the second position detection electrodes farther from the signal supplying portions with respect to the first direction and the position detection lines connected to the second position detection electrodes closer to the signal supplying portions with respect to the first direction can be reduced. Therefore, the position detection performance is less likely to decrease.

(14) The display device may further include floating electrodes on the plate surface of the common board facing away from the array board. The floating electrodes may be arranged between the first position detection electrodes that are adjacent to each other wither respect to the second direction. The floating electrodes may be formed from the transparent electrode film. Because the floating electrodes formed from the transparent electrode film are arranged between the first position detection electrodes adjacent to each other with respect to the second direction in the display area, areas between the first position detection electrodes adjacent to each other with respect to the second direction has the light transmissivity about equal to the light transmissivity of the first position detection electrodes. Therefore, even light transmissivity can be achieved in the display area and thus high display quality can be achieved.

(15) The display device may further include ground electrodes formed from the transparent electrode film on a plate surface of the common board facing away from the array board in the non-display area. The ground electrodes may be arranged to overlap the component drivers and the position detection lines. Because the ground electrodes are arranged to overlap the component drivers, even if noise is generated by the component drivers, the noise can be blocked by the ground electrodes. Furthermore, because the ground electrodes are arranged to overlap the position detection lines, unnecessary capacitance coupling is less likely to occur between the position detection lines and the first position detection electrodes. Therefore, the position detection performance is less likely to decrease.

Advantageous Effect of the Invention

According to the present invention, a reduction in position detection performance can be restricted.

BRIEF DESCRIPTION OF THE DRAWINGS

FIG. 24 is a cross-sectional view along line xxiv-xxiv in FIG. 23.

MODE FOR CARRYING OUT THE INVENTION

<First Embodiment>

Figure 1:
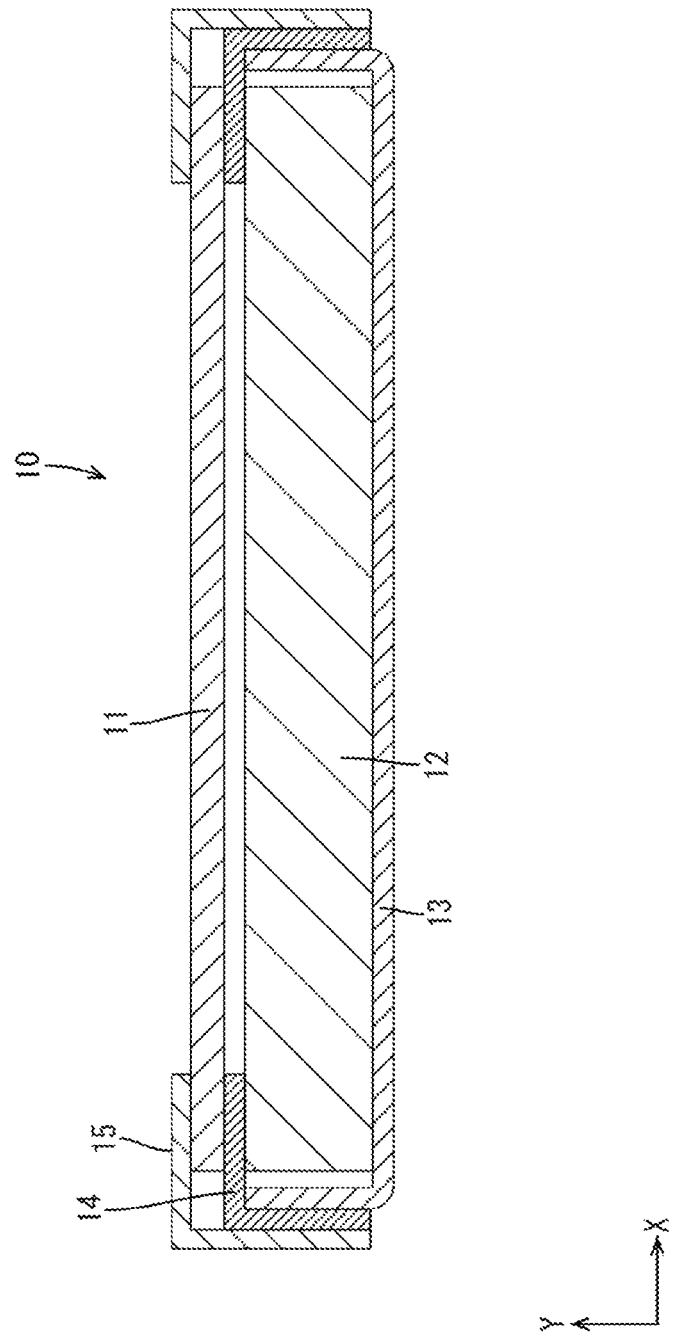
FIG. 1 is a cross-sectional view of a liquid crystal panel according to a first embodiment of the present invention.

A first embodiment of the present invention will be described with reference to FIGS. 1 to 12. In this section, a liquid crystal display device 10 with a position inputting function (a display device with a position inputting function) will be described. X-axes, Y-axes, and Z-axes may be present in the drawings. The axes in each drawing correspond to the respective axes in other drawings. The vertical direction is based on FIG. 2. An upper side and a lower side in FIG. 2 correspond to a front side and a back side of the liquid crystal display device 10, respectively.

Figure 2:
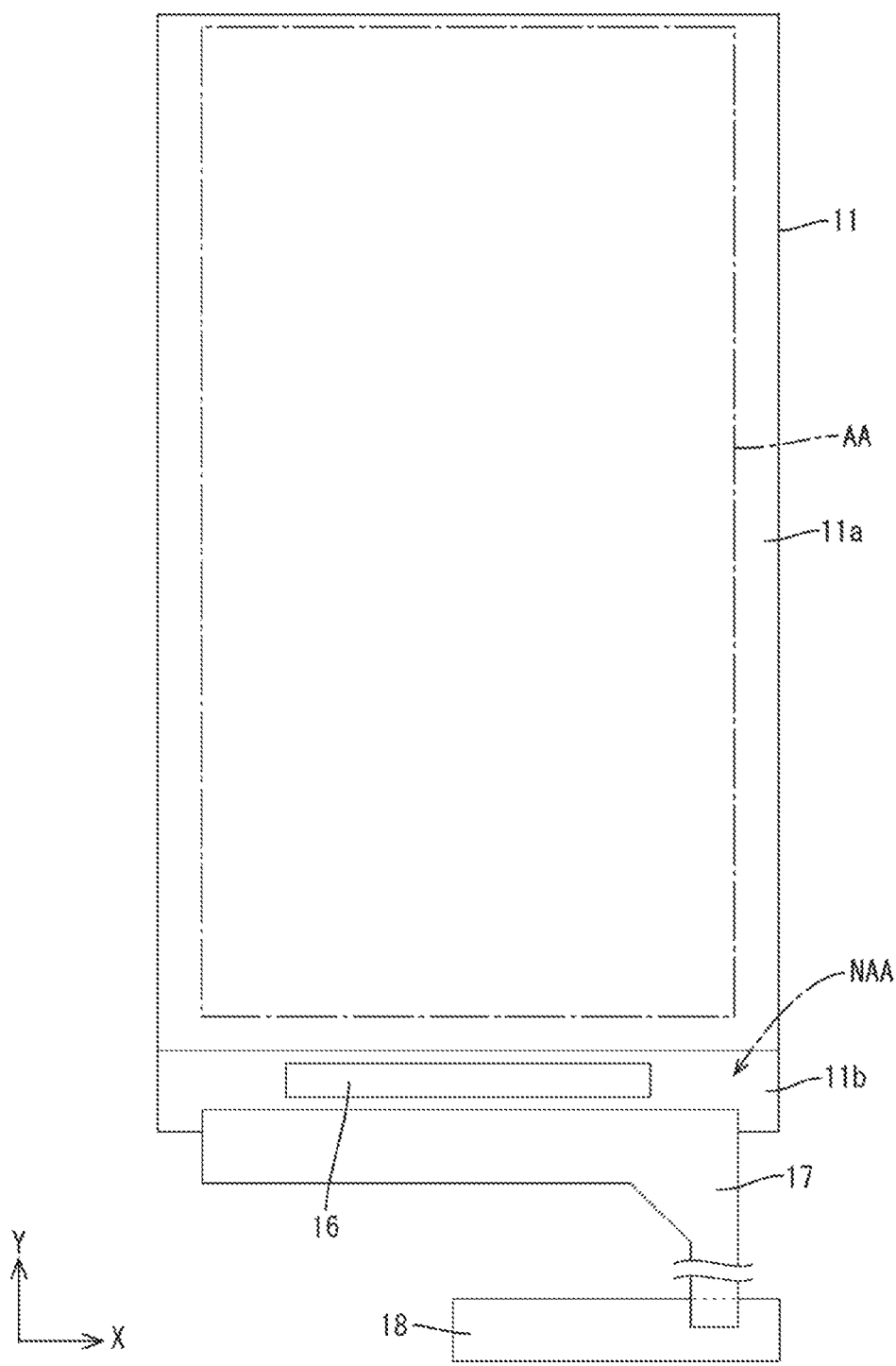
FIG. 2 is a plan view of a liquid crystal panel included in the liquid crystal display device.

As illustrated in FIGS. 1 and 2, the liquid crystal display device 10 includes a liquid crystal panel 11 (a display panel with a position inputting function) and a backlight unit 12 (a lighting device). The liquid crystal panel 11 is for display images and for detecting position information input by a user based on the images. The backlight unit 12 is an external light source for supplying light to the liquid crystal panel 11 used for image display. The liquid crystal display device 10 further includes a chassis 13, a frame 14, and a bezel 15 (a holding member). The chassis 13 holds the backlight unit 12 therein. The frame 14 holds the backlight unit 12 together with the chassis 13. The bezel 15 holds the liquid crystal panel 11 together with the frame 14. The backlight unit 12 includes at least a light source (e.g., cold cathode fluorescent tubes, LEDs, organic ELs) and an optical member having an optical function for converting light emitted by the light source into planar light.

The liquid crystal display device 10 according to this embodiment may be for various electronic devices (not illustrated) including mobile phones (including smartphones), notebook personal computers (including tablet personal computers), portable information terminals (including electronic books and PDAs), digital photo frames, and portable video game players. Therefore, a screen size of the liquid crystal panel 11 in the liquid crystal display device 10 may be some inches to 10 plus some inches, which is usually categorized as a small size display or a small-to-medium size display.

The liquid crystal panel 11 will be described. As illustrated in FIG. 2, the liquid crystal panel 11 has a vertically-long rectangular overall shape with a long-side direction and a short-side direction correspond with the Y-axis direction and the X-axis direction, respectively. The liquid crystal panel 11 includes a display area (an active area) AA and a non-display area (a non-active area) NAA. The display area AA is an area in which images are displayed and the non-display area NAA is an area in which the images are not displayed. The non-display area NAA has a picture frame shape (a frame shape) surrounding the display area AA. The display area AA is located closer to an edge of the liquid crystal panel 11 with respect to the long-side direction (on an upper side in FIG. 2). The non-display area NAA includes an area having a substantially frame shape surrounding the display area AA (a frame portion of a CF board 11a, which will be described later) and an area at the other end with respect to the long-side direction (on a lower side in FIG. 2, an exposed area of an array board 11b which does not overlap the CF board 11a and will be described later). The exposed area is a mounting area for a driver 16 (a panel driver) for driving the liquid crystal panel and a flexible circuit board 17 (an external connecting component). The flexible circuit board 17 has flexibility. The flexible circuit board 17 connects the liquid crystal panel 11 to a control circuit board 18 that is an external signal source. Various signals are transmitted from the control circuit board 18 to the driver 16 or other components via the flexible circuit board 17.

The driver 16 includes an LSI chip containing a driver circuit therein. The driver 16 processes input signals from the control circuit board 18 and produces output signals. The driver 16 inputs the output signals to the display area AA of the liquid crystal panel 11. In FIG. 2, an outline of the display area AA having a frame shape slightly smaller than the CF board 11a is indicated with a chain line. An area outside the chain line is the non-display area NAA.

Figure 7:
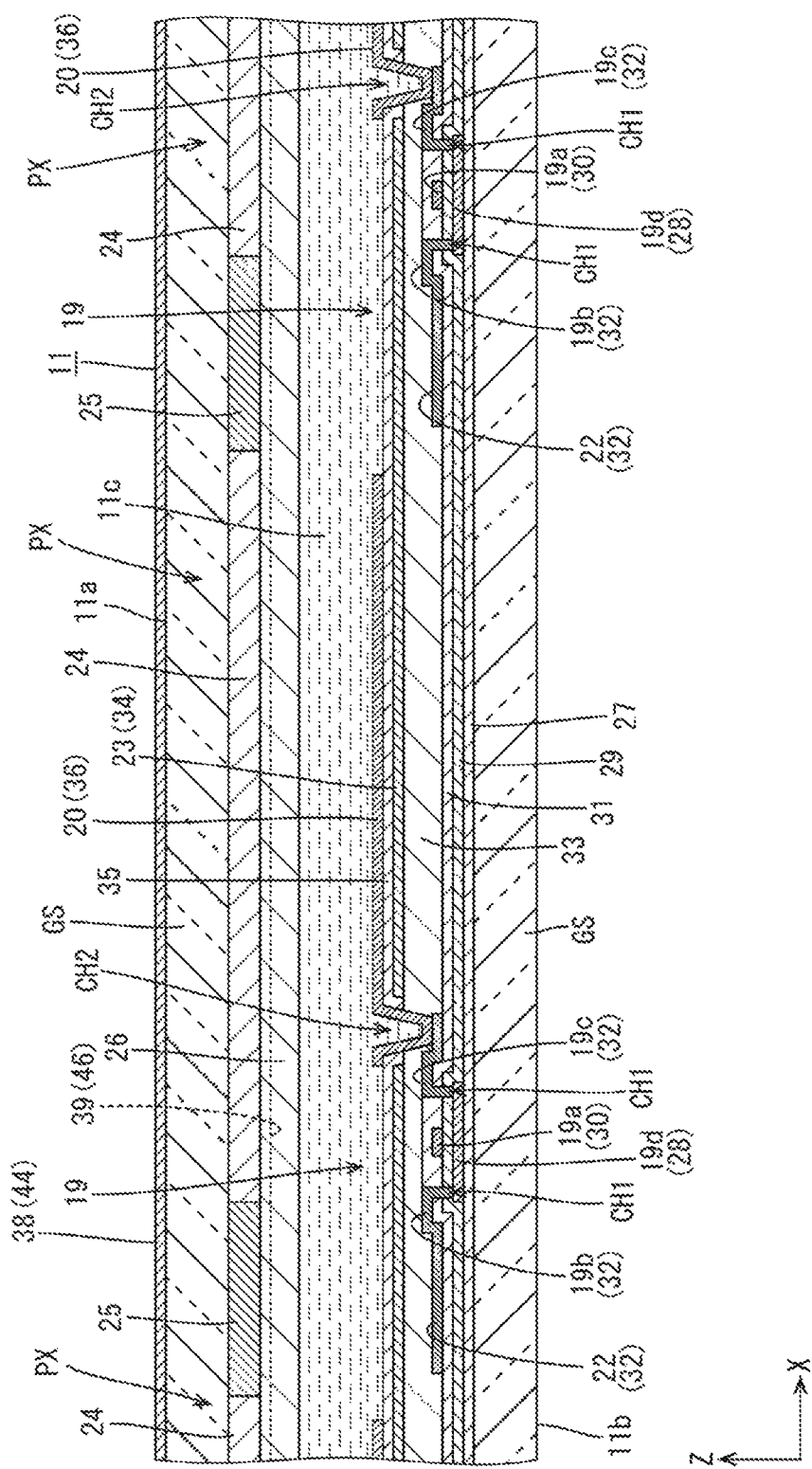
FIG. 7 is a cross-sectional view along line vii-vii in FIG. 6.

As illustrated in FIGS. 2 and 7, the liquid crystal panel 11 includes a pair of boards 11a and 11b and a liquid crystal layer 11c (liquid crystals) between the boards 11a and 11b. The liquid crystal layer 11c contains liquid crystal molecules that are substances having optical characteristics that change according to application of an electric field. The boards 11a and 11b are bonded together with a sealing member, which is not illustrated, with a gap corresponding to a thickness of the liquid crystal layer 11c maintained therebetween. One of the boards 11a and 11b on the front side is the CF board 11a (a common board) and the other on the rear side (back side) is the array board 11b (a component board, an active matrix board). The CF board 11a and the array board 11b include substantially transparent glass substrates GS (having high light transmissivity) and various films formed on the glass substrates GS by a known photolithography method. As illustrated in FIG. 2, the CF board 11a has a short dimension about equal to a short dimension of the array board 11b and a long dimension smaller than a long dimension of the array board 11b. The CF board 11a is bonded to the array board 11b with one of ends of the CF board 11a with respect to the long-side direction (on the upper side in FIG. 2) is aligned with a corresponding end of the array board 11b. A predefined area of the other end of the array board 11b with respect to the long-side direction (on the lower side in FIG. 2) does not overlap the CF board 11a. A front plate surface and a rear plate surface of the predefined area of the array board 11b are exposed to the outside. The predefined area includes the mounting area for mounting the driver 16 and the flexible circuit board 17. Alignment films (not illustrated) for adjustment of orientations of the liquid crystal molecules in the liquid crystal layer 11c are formed to directly face the liquid crystal layer 11c. Polarizing plates (not illustrated) are attached to outer surfaces of the boards 11a and 11b.

Figure 6:
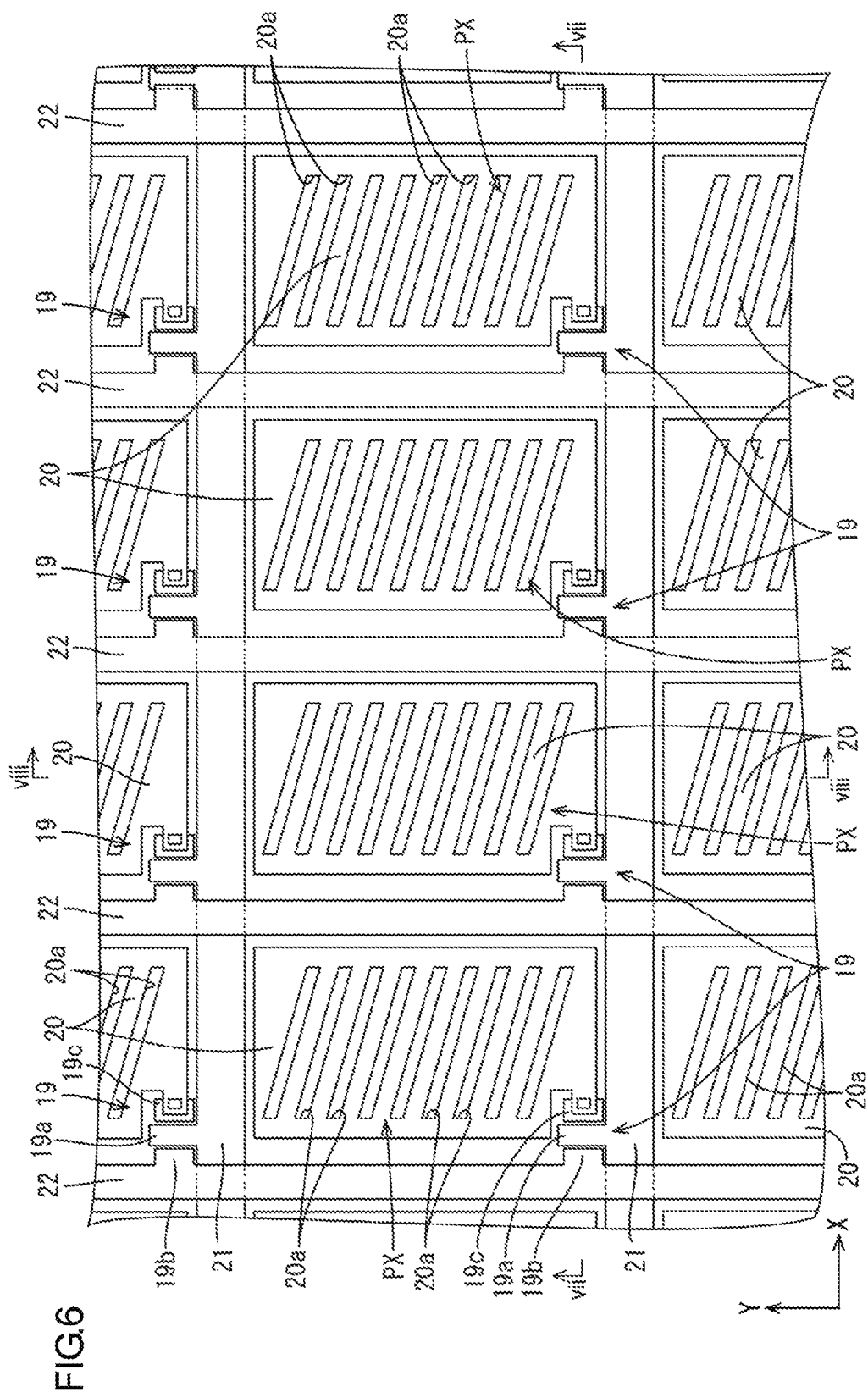
FIG. 6 is a magnified plan view of a middle portion of the array board.

Configurations of portions of the array board 11b and the CF board 11a in the display area AA will be briefly described. As illustrated in FIGS. 6 and 7, thin film transistors (TFTs, display components) 19 and pixel electrodes 20 are arranged in a matrix in an area of an inner surface of the array board 11b (on a liquid crystal layer 11c side, on an opposed surface side opposed to the CF board 11a) in the display area AA. The TFTs are switching components. Gate lines 21 and source lines 22 are routed in a grid to surround the TFTs 19 and the pixel electrodes 20. The TFTs 19 and the pixel electrodes 20 are arranged at intersections of the gate lines 21 and the source lines 22 routed in the grid to form the matrix. The gate lines 21 are connected to gate electrodes 19a of the TFTs 19 and the source lines 22 are connected to source electrodes 19b of the TFTs 19. The pixel electrodes 20 are connected to drain electrodes 19c of the TFTs 19. The TFTs 19, the pixel electrodes 20, the gate lines 21, and the source lines 22 are included in a display circuit that is a circuit for displaying images. A detailed configuration of the TFTs 19 will be described later. Each pixel electrode 20 has a vertically-long rectangular shape in a plan view. The array board 11b includes common electrodes 23. Electric fields are produced between the pixel electrodes 20 and the common electrodes 23 when a common potential (a reference potential) is applied to the common electrodes 23. Namely, the liquid crystal panel 11 according to this embodiment operates in fringe field switching (FFS) mode that is an improved mode of an in-plane switching (IPS) mode. The array board 11b includes the pixel electrodes 20 and the common electrodes 23 that are formed in different layers. Each pixel electrode 20 includes slits 20a formed at intervals to extend in a slanting direction relative to the X-axis direction and the Y-axis direction in a plan view. With the slits 20a, when a potential difference is produced between the pixel electrode 20 and the common electrode 23 that are formed in the different layer, a fringe electric field (an oblique electric field) including a component along a plate surface of the array board 11b and a component along a direction normal to the plate surface of the array board 11b is applied. Orientations of the liquid crystal molecules in the liquid crystal layer 11c can be properly adjusted using the fringe electric field.

As illustrated in FIG. 7, the CF board 11a includes color filters 24 formed in an area of an inner surface of the CF board 11a (on the liquid crystal layer 11c side, on an opposed side opposed to the array board 11b) in the display area AA. The color filters 24 include red (R), green (G), and blue (B) color portions arranged in a matrix to overlap the pixel electrodes 20 of the array board 11b in a plan view. A light blocking portion 25 (a black matrix) is formed in a grid pattern to extend among the color portions of the color filters for reducing color mixture. The light blocking portion 25 are arranged to overlap the gate lines 21 and the source lines 22 in the plan view. A planarization film 26 (a protective film, an overcoat film) is formed on surfaces of the color filters 24 and the light blocking portion 25. In the liquid crystal panel 11, one display pixel, which is a unit of image display, includes three color portions of red (R), green (G), and blue (B) and three pixel electrodes 20 opposed to the color portions. Each display pixel includes three pixel portions PX of R, G and B. Each pixel portion PX includes the pixel electrode 20 and the color portion opposed to the pixel electrode 20. The pixel portions PX are repeatedly arranged within a plate surface of the liquid crystal panel 11 along the row direction (the X-axis direction). Lines of the pixel portions PX are arranged along the column direction (the Y-axis direction). The light blocking portion 25 is arranged to separate the adjacent pixel portions PX from each other.

Next, a configuration of the various films formed in layers on the inner surface side of the array board 11b by the known photolithography method will be described in detail The configuration includes a sequence of the layers. The array board 11b mainly includes components for performing a function for displaying images (a display function), which is one of functions of the liquid crystal panel 11. Specifically, as illustrated in FIG. 7, the array board 11b includes a basecoat film 27, a semiconductor film 28, a gate insulating film 29 (an inorganic insulating film), a first metal film 30 (a gate metal film), a first interlayer insulating film 31 (an inorganic insulating film), a second metal film 32 (a source metal film), a planarization film 33 (an organic insulating film), a first transparent electrode film 34, a second interlayer insulating film 35 (an inorganic insulating film), and a second transparent electrode film 36 in this sequence from a lower layer side (a glass substrate GS side, the rear side). Although not illustrated, the alignment film is formed over the second interlayer insulating film 35 and the second transparent electrode film 36.

The basecoat film 27 is formed in a solid pattern to cover an entire surface of the glass substrate GS of the array board 11b. The basecoat film 27 is made of silicon oxide (SiO2), silicon nitride (SiNx), or silicon oxide nitride. The semiconductor film 28 is formed over the basecoat film 27 and in a pattern to be arranged in the display area AA and the non-display area NAA. The semiconductor film 28 is formed in an island pattern that corresponds to arrangement of the TFTs 19, which will be described later, at least in the display area AA. The semiconductor film 28 is formed from continuous grain (CG) silicon thin film, which is a kind of silicon thin films having polycrystalline structures (polycrystalline silicon thin films). The CG silicon thin film may be formed by adding a metal material to the amorphous silicon thin film and by performing thermal processing at low temperature of 550° C. or lower for a short period. Therefore, atomic arrangement at crystal grain boundaries of silicon crystals has continuity. The gate insulating film 29 is formed above the basecoat film 27 and the semiconductor film 28 in a solid pattern across the display area AA and the non-display area NAA. The gate insulating film 29 may be made of silicon oxide (SiO2).

The first metal film 30 is formed above the gate insulating film 29 and in a pattern to be arranged in the display area AA and the non-display area NAA. The first metal film 30 may be formed from a multilayer film of titanium (Ti) and copper (Cu). The gate lines 21 and the gate electrodes 19a are formed from the first metal film 30. The first interlayer insulating film 31 is formed above the gate insulating film 29 and the first metal film 30. The first interlayer insulating film 31 is formed in a solid pattern across the display area AA and the non-display area NAA. The first interlayer insulating film 31 may be made of silicon oxide (SiO2). Intersections between the gate lines 21 and the source lines 22 are insulated with the first interlayer insulating film 31. The second metal film 32 is formed above the first interlayer insulating film 31. The second metal film 32 is formed in a pattern to be arranged in the display area AA and the non-display area NAA. The second metal film 32 may be formed from a multilayer film of titanium (Ti) and copper (Cu). The source lines 22, the source electrodes 19b, and the drain electrodes 19c are formed from the second metal film 32. The planarization film 33 is formed above the first interlayer insulating film 31 and the second metal film 32. The planarization film 33 is formed in a solid pattern across the display area AA and the non-display area NAA. The planarization film 33 may be made of acrylic resin such as polymethylmethacrylate (PMMA). The planarization film 33 has a thickness larger than thicknesses of the insulating films 29, 31, and 35, which are inorganic insulating films. Therefore, the planarization film 33 properly planarizes a surface of the array board 11b on the liquid crystal layer 11c side (on which the alignment film is formed).

The first transparent electrode film 34 is formed above the planarization film 33. The first transparent electrode film 34 is formed in a substantially solid pattern at least in the display area AA. The first transparent electrode film 34 may be made of transparent electrode material such as indium tin oxide (ITO) and zinc oxide (ZnO). The common electrodes 23 in a substantially solid pattern are formed from the first transparent electrode film 34. The second interlayer insulating film 35 is formed above the planarization film 33 and the first transparent electrode film 34. The second interlayer insulating film 35 is formed in a solid pattern across the display area AA and the non-display area NAA. The second interlayer insulating film 35 may be made of silicon nitride (SiNx). The second transparent electrode film 36 is formed above the second interlayer insulating film 35. The second transparent electrode film 36 is formed in an island pattern that corresponds to the arrangement of the TFTs 19 in the display area AA. The second transparent electrode film 36 may be made of transparent electrode material such as indium tin oxide (ITO) and zinc oxide (ZnO). The pixel electrodes 20 are formed from the second transparent electrode film 36. The gate insulating film 29, the first interlayer insulating film 31, the planarization film 33, and the second interlayer insulating film 35 include holes. The holes include contact holes CH1 and CH2 that are formed at predefined positions by patterning in the production process of the array board 11b.

As illustrated in FIG. 7, each TFT 19 of the array board 11b in the display area AA includes a channel 19d, the gate electrode 19a, the source electrode 19b, and the drain electrode 19c. The channel 19d is formed from the semiconductor film 28. The gate electrode 19a is over the channel 19d with the gate insulating film 29 therebetween. The source electrode 19b and the drain electrode 19c are above the gate electrode 19a with the first interlayer insulating film 31 between the gate electrode 19a and the source electrode 19b or the drain electrode 19c. The TFTs 19 are top-gate (staggered-type) transistors. Each source electrode 19b and each drain electrode 19c are connected to the corresponding channel 19d through the contact holes CH1 that are formed in the gate insulating film 29 and the first interlayer insulating film 31. According to the configuration, electrons can be movable between the source electrode 19b and the drain electrode 19c. The semiconductor film 28 that forms the channel 19d is formed from the CG silicon thin film. The CG silicon thin film has electron mobility of, for example, 200 to 300 cm2/Vs, which is higher than electron mobility of an amorphous silicon thin film. Therefore, by forming the channel 19d of the TFT 19 from the semiconductor film 28 formed from the CG silicon thin film, the size of the TFT 19 can be reduced and the amount of transmitting light through the semiconductor film 28 can be maximized. This configuration is preferable for improving definition and reducing power consumption. Each pixel electrode 20 that is formed from the second transparent electrode film 36 is connected to the drain electrode 19c of the corresponding TFT 19 via the contact holes CH2 that are formed in the planarization film 33 and the second interlayer insulating film 35. When the gate electrode 19a of the TFT 19 is conducted, a current flows between the source electrode 19b and the drain electrode 19c via the channel 19d and a predefined potential is applied to the pixel electrode 20. The common electrodes 23 that are formed from the first transparent electrode film 34 overlap the respective pixel electrodes 20 in a plan view with the second interlayer insulating film 35 therebetween. As described earlier, the common electrodes 23 that are formed in the solid pattern includes holes at positions that correspond to the contact holes CH2 in the planarization film 33 and the second interlayer insulating film 35 in the plan view for passing contact portions of the pixel electrodes 20.

Figure 3:
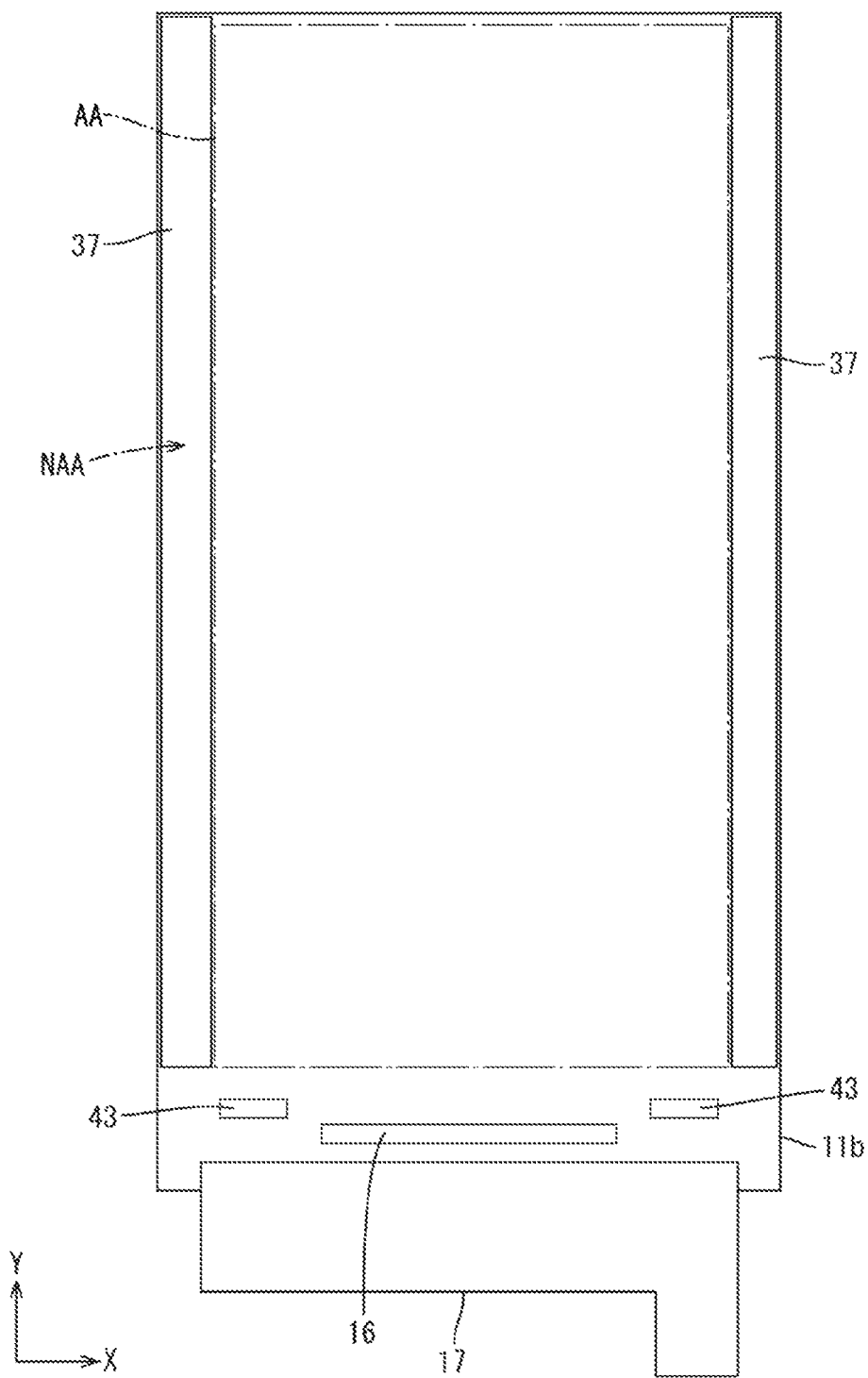
FIG. 3 is a plan view of an array board included in the liquid crystal panel.

Next, a configuration of portions of the array board 11b in the non-display area NAA will be described. As illustrated in FIG. 3, monolithic circuits 37 (a component driver portion) are arranged in the portions of the array board 11b in the non-display area NAA adjacent to the display area AA with respect to the X-axis direction (the short-side direction of the liquid crystal panel 11). The monolithic circuits 37 and the TFTs 19 are included in a display circuit. A pair of the monolithic circuits 37 is arranged such that the monolithic circuits 37 sandwich the display area AA with respect to the X-axis direction. The monolithic circuits 37 are formed in areas that extend for about an entire length of the display area AA along the Y-axis direction. The monolithic circuits 37 are connected to the gate lines 21 that are routed out of the display area AA and configured to perform control for supplying output signals of the driver 16 to the TFTs 19 Each monolithic circuit 37 is monolithically formed on the array board 11b with the semiconductor film 28 as a base. The semiconductor film 28 is the film used for the TFTs 19 in the display area AA. The monolithic circuits 37 include control circuits for controlling supply of signals to the TFTs 19 and components of the control circuits. The components of the control circuits include circuit TFTs (circuit thin film transistors) which use the semiconductor film 28 as channels. The circuit TFTs are not illustrated. The control circuits include circuit lines that are formed from the first metal film 30 and the second metal film 32. The monolithic circuits 37 include scan circuits for scanning the gate lines 21 in sequence. The monolithic circuit 37 may include an auxiliary circuit such as a level shifter circuit or an ESD protection circuit. The monolithic circuits 37 are connected to the driver 16 with connecting lines, which are not illustrated, formed on the array board 11b.

Figure 4:
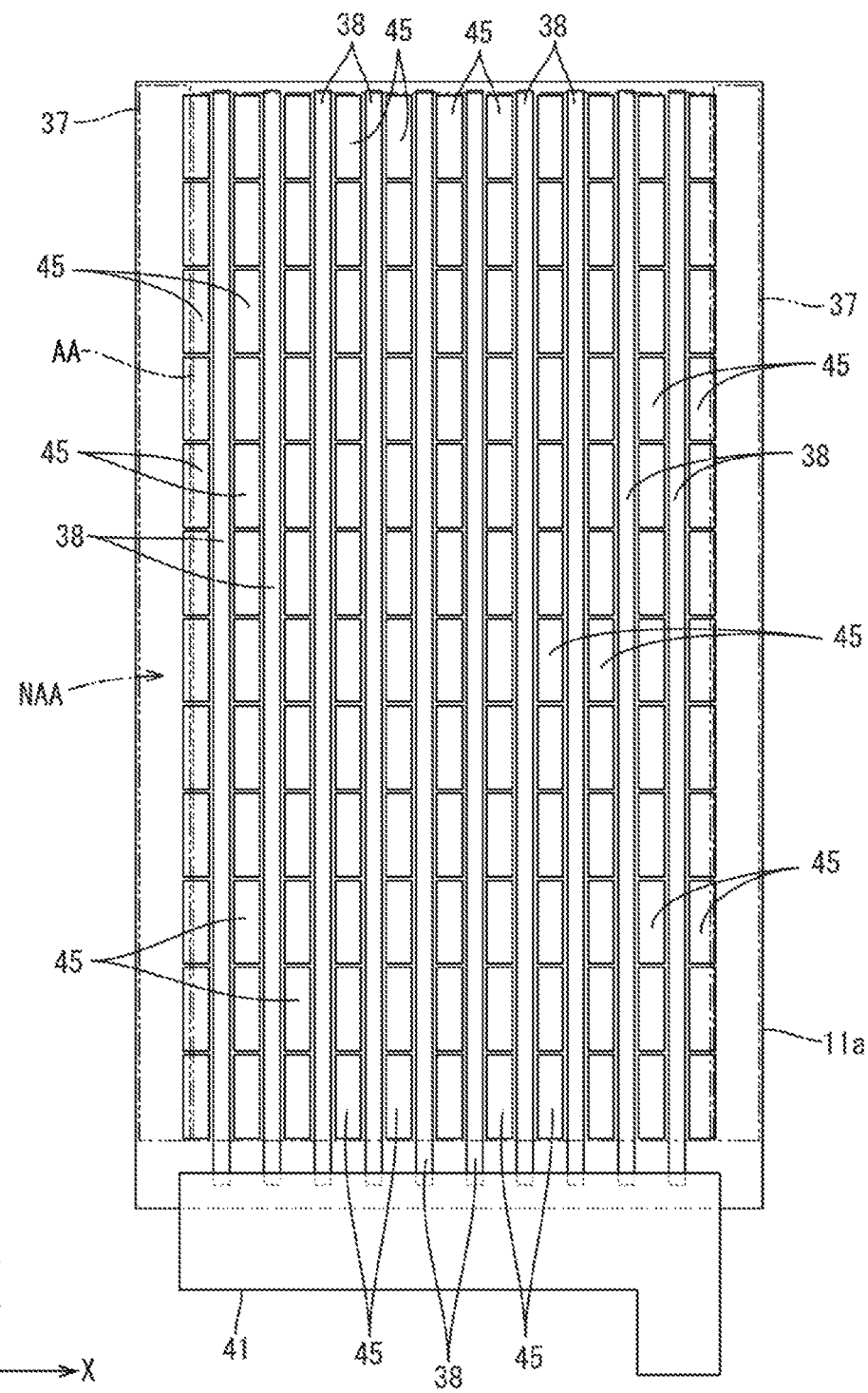
FIG. 4 is a plan view of a CF board included in the liquid crystal panel.
Figure 5:
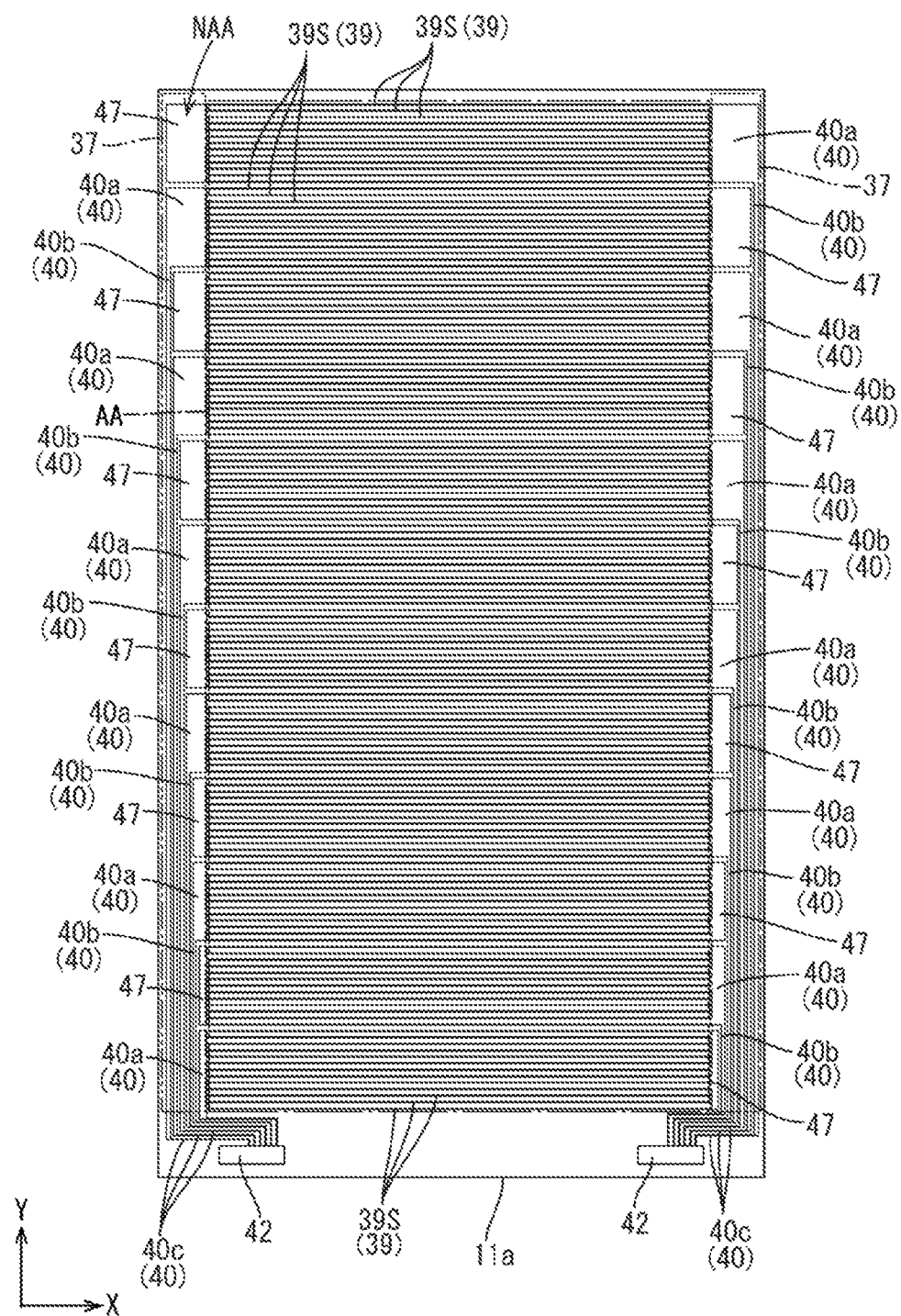
FIG. 5 is a bottom view of the CF board included in the liquid crystal panel.

As described earlier, the liquid crystal panel 11 according to this embodiment includes the display function and the position inputting function. The display function is for image display. The position inputting function is for detecting position information, which is input by the user, based on a displayed image. The liquid crystal panel 11 includes a touchscreen pattern for performing the position inputting function. The touchscreen pattern is embedded in the liquid crystal panel 11 (with the in-cell technology). The touchscreen pattern uses the projection-type capacitive touchscreen technology, that is, a mutual capacitive detection method. The touchscreen pattern is included only in the CF board 11a. Specifically, as illustrated in FIGS. 4 and 5, the touchscreen pattern includes at least detection electrodes 38 (first position detection electrodes, receiving electrodes) and drive electrodes 39 (second position detection electrodes, transmitting electrodes). The detection electrodes 38 are arranged on an outer surface side of the CF board 11a (on the side opposite from the liquid crystal layer 11c side, the front side, a display surface side) and the drive electrodes 39 are arranged on an inner surface side of the CF board 11a (on the liquid crystal layer 11c side, the rear side, the side opposite from a display surface side). With the touchscreen pattern TPP, whether or not an input of position information (touch operation) is present is detected based on a difference in capacitance between when an object (e.g., a finger of the user) which interrupts an electric field between the detection electrode 38 and the drive electrode 39 is present and when the object is not present. The detection electrodes 38 and the drive electrodes 39 included in the touchscreen pattern are arranged in the portion of the CF board 11a within the display area AA. The display area AA of the liquid crystal panel 11 substantially corresponds with a touch area in which input positions are detectable. The non-display area NAA substantially corresponds with a non-touch area in which input positions are not detectable. In the edge areas at the ends with respect to the short-side direction which corresponds to the non-touch area of the inner surface of the CF board 11a (the non-display area NAA), position detection line portions 40 are formed. The position detection line portions 40 are connected to the drive electrodes 39 for transmitting signals to the drive electrodes 39.

A touchscreen flexible circuit board 41 is connected to the end portion at an end with respect to the long-side direction which corresponds to the non-touch area of the outer surface of the CF board 11a (the end portion on the lower side in FIGS. 4 and 5). The touchscreen flexible circuit board 41 is for transmitting signals between the touchscreen controller, which is not illustrated, and the detection electrodes 38. The touchscreen flexible circuit board 41 overlaps the flexible circuit board 17 connected to the liquid crystal panel 11 in the plan view. The flexible circuit board 17 is for image display. The CF board 11a includes a pair of CF board-side contacts 42 (a signal supplying portion, a common board-side signal supplying portion) in the non-touch area of the inner surface of the CF board 11a overlapping the touchscreen flexible circuit board 41. The CF board-side contacts 42 are connected to ends of the position detection line portions 40 opposite from ends connected to the drive electrodes 39. The array board 11b includes a pair of array board-side contacts 43 (a component board-side signal supplying portion) in the non-touch area of the inner surface of the array board 11b. The array board-side contact 43 overlaps the CF board-side contacts 42. The array board-side contacts 43 are electrically connected to the CF board-side contacts 42. The signals from the touchscreen controller, which is not illustrated, are sequentially transmitted to the drive electrodes 39 via the flexible circuit board 17, the array board-side contacts 43, the CF board-side contacts 42, and the position detection line portions 40. The CF board-side contacts 42 and the array board-side contacts 43 overlap the seating member (not illustrated) for sealing the liquid crystal layer 11c in the plan view and are electrically connected to each other via conductive grains that are contained in the sealing member.

Figure 9:
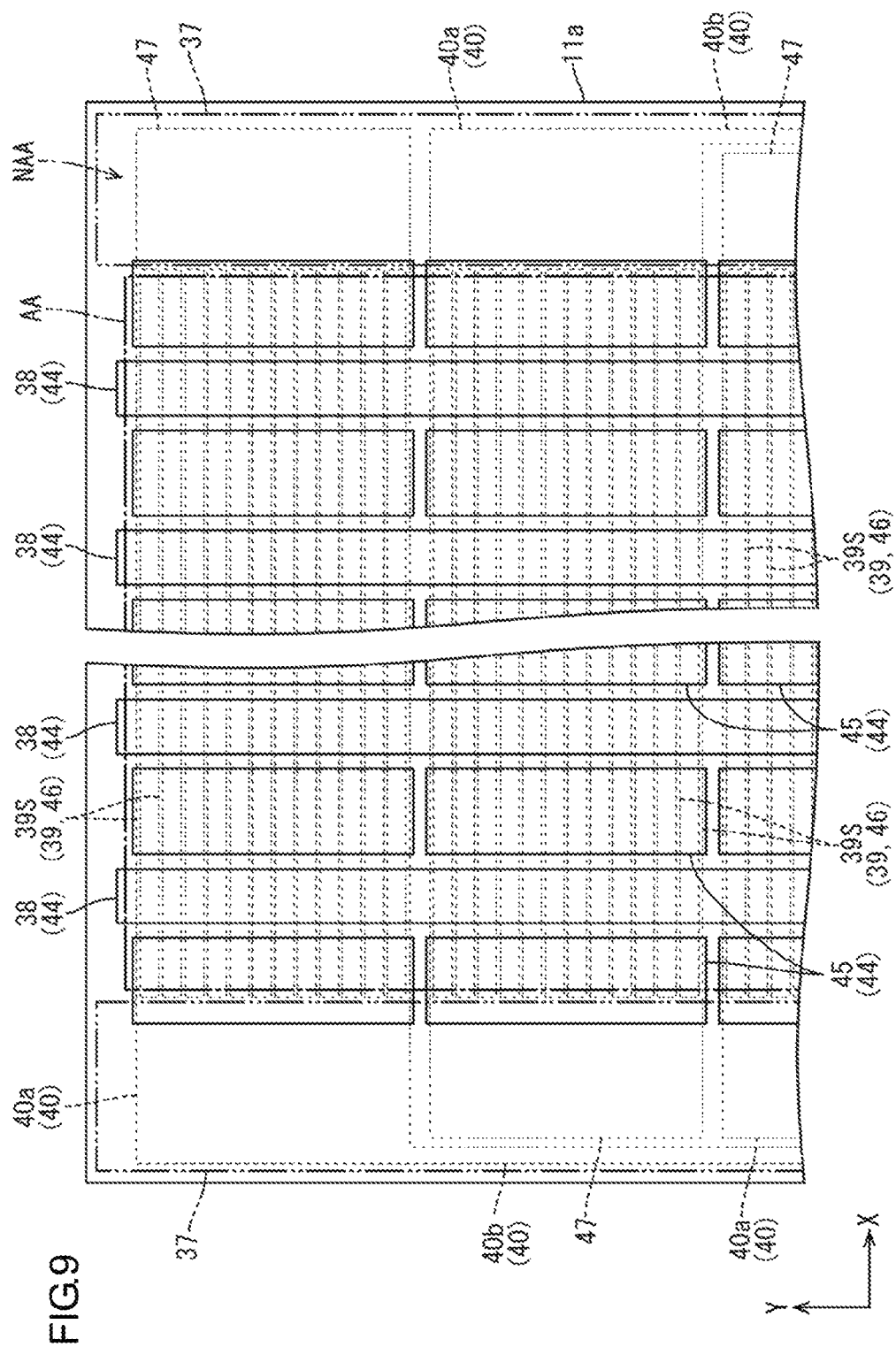
FIG. 9 is a magnified plan view of a middle portion of the CF board.

As illustrated in FIGS. 4 and 9, each of the detection electrodes 38 is formed on the outer surface of the CF board 11a to extend along the Y-axis direction (a first direction). The detection electrode 38 has a vertically-long rectangular two-dimensional shape. The detection electrodes 38 are formed from a transparent electrode film 44 that is made of transparent electrode material such as indium tin oxide (ITO) and zinc oxide (ZnO) similar to the pixel electrodes 20 and the common electrodes 23. Therefore, the detection electrodes 38 are less likely to be recognized by the user although the detection electrodes 38 are arranged in the portion of the CF board 11a within the display area AA. Each detection electrode 38 has a length larger than a length of the display area AA. An end of the detection electrode 38 (on the lower side in FIG. 4) reaches the non-display area NAA. The end of the detection electrode 38 is connected to the touchscreen flexible circuit board 41. The detection electrode 38 has a width larger than a dimension of the display pixel (the pixel portion PX) with respect to the X-axis direction and thus the detection electrode 38 crosses multiple display pixels (pixel portions PX) (see FIG. 7). Specifically, the width of the detection electrode 38 is about some millimeters, that is, significantly larger than the dimension of the display pixel (the pixel portion PX) with respect to the X-axis direction, which is about some hundreds micrometers.

As illustrated in FIGS. 4 and 9, the detection electrodes 38 are arranged at intervals with respect to the X-axis direction (the second direction) on the outer surface of the CF board 11a in the display area AA. The intervals of the detection electrodes 38 arranged with respect to the X-axis direction are equal to each other. Floating electrodes 45 are arranged adjacent to the detection electrodes 38 on the outer surface of the CF board 11a within the display area AA. The floating electrodes 45 are physically and electrically isolated from the detection electrodes 38 such that the floating electrodes 45 form an islands pattern. The floating electrodes 45 are formed from the transparent electrode film 44 that forms the detection electrodes 38 in the same layer as the detection electrodes 38 on the outer surface of the CF board 11a. Each floating electrode 45 has a vertically-long rectangular two-dimensional shape with a long dimension smaller than a long dimension of the detection electrode 38. The floating electrodes 45 are arranged along the Y-axis direction. With the floating electrodes 45, the light transmissivity in areas between the detection electrodes 38 adjacent to each other with respect to the X-axis direction is about equal to the light transmissivity in the areas in which the detection electrodes 38 are arranged. Therefore, the detection electrodes 38 are less likely to be recognized by the user.

Figure 10:
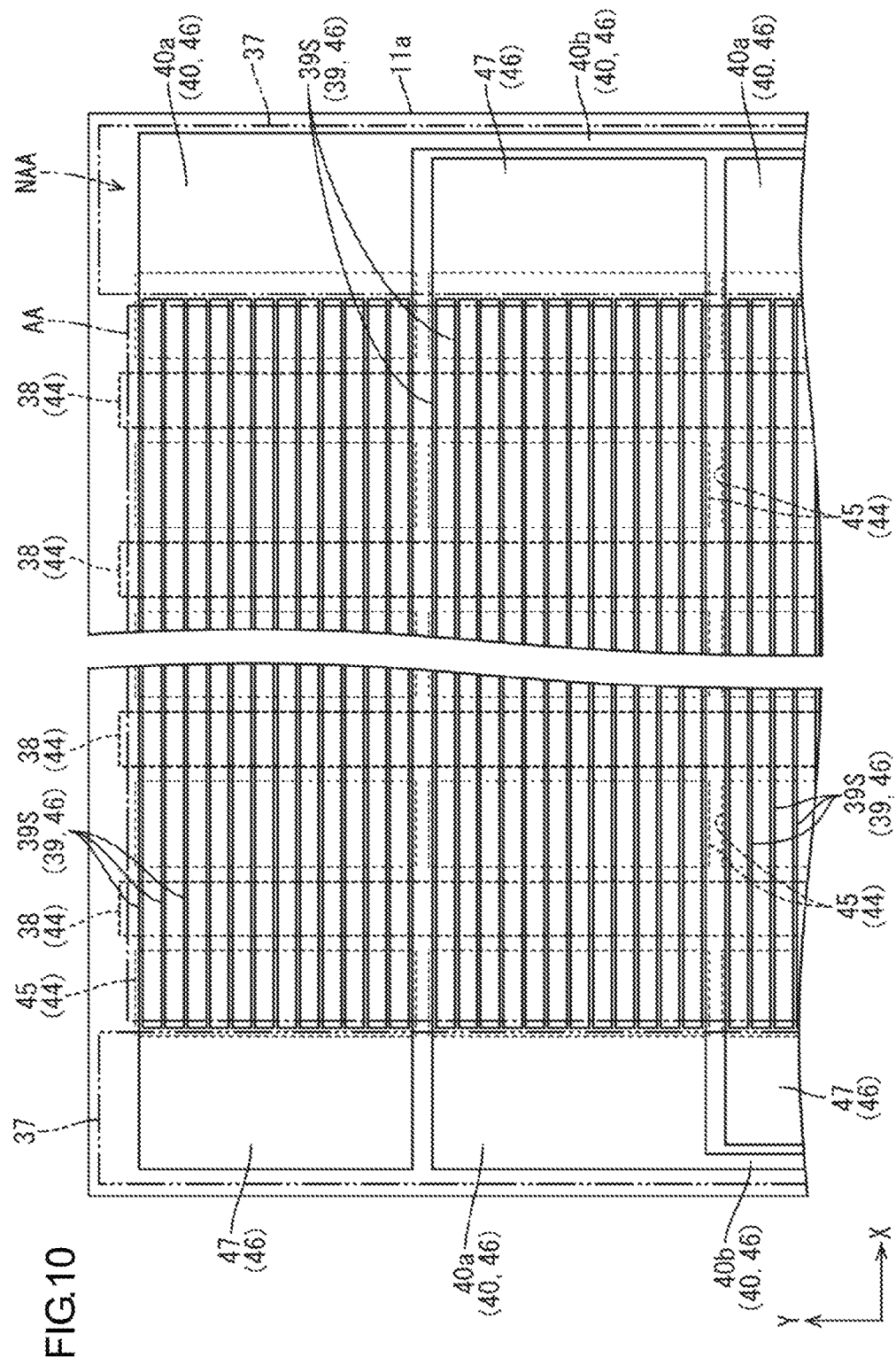
FIG. 10 is a magnified bottom view of the portions of the CF board at the ends with respect to the short-side direction at an end with respect to a long-side direction opposite from a terminal portion side.

As illustrated in FIGS. 5 and 10, the drive electrodes 39 extend along the X-axis direction (the second direction) perpendicular to the Y-axis direction (the first direction) in which the detection electrodes 38 extend inside the inner surface of the CF board 11a within the display area AA. Each drive electrode 39 has a length about equal to the short dimension of the display area AA and a width larger than the width of the detection electrode 38. The drive electrodes 39 are arranged along the Y-axis direction (the first direction) perpendicular to the extending direction of the drive electrodes 39 within the inner surface of the CF board 11a in the display area AA. Portions of the drive electrodes 39 cross the detection electrodes 38 in the plan view. The portions of the drive electrodes 39 are opposed to portions of the detection electrodes 38 with the glass substrate GS of the CF board 11a therebetween. The portions of the drive electrodes 39 and portions of the detection electrodes 38 form electric fields. The drive electrodes 39 are formed from a metal film 46 having the conductivity higher than the transparent electrode film 44 that forms the detection electrodes 38 and thus the wire resistances are reduced. The metal film 46 that forms the drive electrodes 39 is made of metal material such as aluminum, molybdenum, titanium, tungsten, copper, silver, and gold. The metal film 46 that forms the drive electrode 39 forms CF board-side contacts 42.

Figure 8:
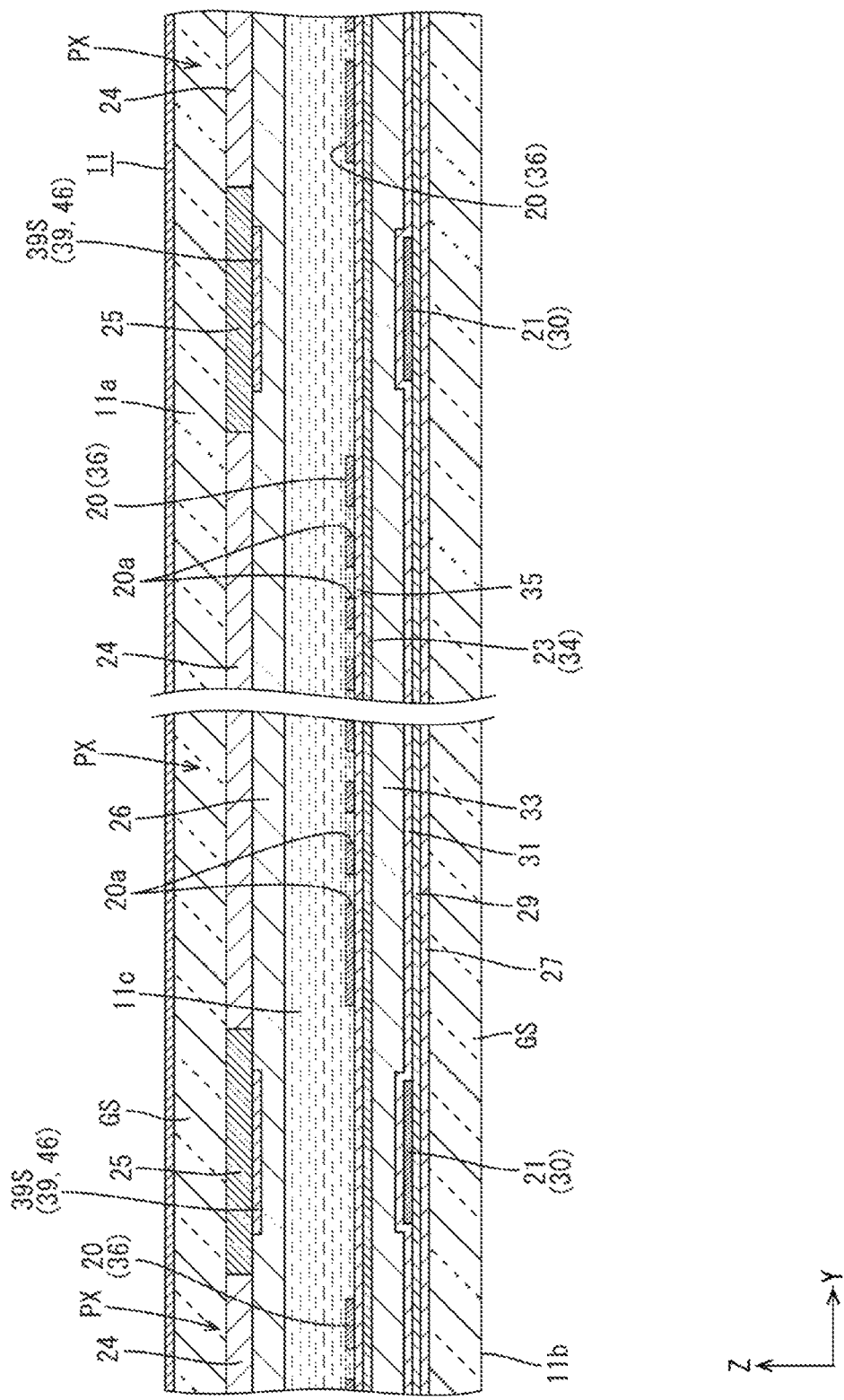
FIG. 8 is a cross-sectional view along line viii-viii in FIG. 6.
Figure 12:
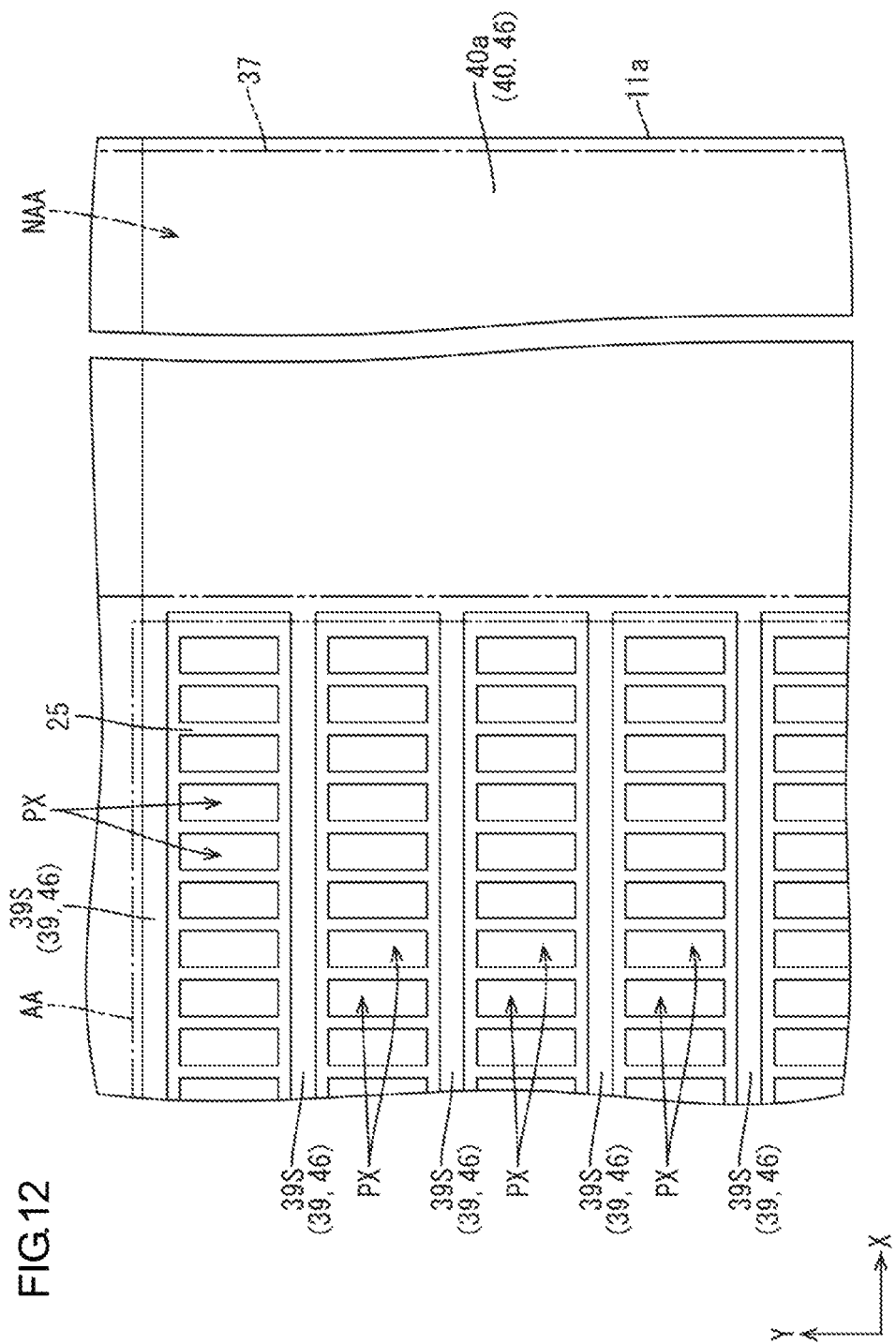
FIG. 12 is a magnified bottom view of the portion of the CF board at the end with respect to the short-side direction at an end with respect to the long-side direction on the terminal portion side.

The metal film 46 that forms the drive electrode 39 has high conductivity but very low light transmissivity. Therefore, the drive electrodes 39 of the CF board 11a in the display area AA may be recognized by the user. As illustrated in FIGS. 8 and 12, the drive electrodes 39 include drive electrode segments 39S (second position detection electrode segments, unit drive electrodes) which are separated from one another. The drive electrode segments 39S are arranged to overlap sections of the light blocking portion 25 of the CF board 11a in the plan view. The drive electrode segments 39S of the drive electrodes 39 extend along the X-axis direction (the second direction). The drive electrode segments 39S are arranged over sections of the light blocking portion 25 which extend along the X-axis direction (on the array board 11b side, the liquid crystal layer 11c side, a side opposite from the glass substrate GS side). Because the drive electrodes 39 are hidden from the user with the light blocking portion 25, ambient light is less likely to be reflected by the drive electrodes 39 and the drive electrodes 39 are less likely to be recognized by the user. The drive electrode segments 39S are arranged at intervals with respect to the Y-axis direction (the first direction). The intervals are about equal to the intervals of the gate lines 21 arranged in the Y-axis direction (the intervals of the pixel portions PX with respect to the Y-axis direction, the length of the pixel electrodes 20). The drive electrode segments 39S are arrange to overlap the gate lines 21 in the plan view. The drive electrode segments 39S of the drive electrodes 39 have widths slightly smaller than widths of the sections of the light blocking portion 25 which extend in the X-axis direction. Even if relative positions of the light blocking portion 25 and the drive electrodes 39 are shifted during patterning in the production process of the CF board 11a, the drive electrode segments 39S and the light blocking portion 25 are more likely to overlap each other. The widths of the drive electrode segments 39S are smaller than the widths of the detection electrodes 38.

As illustrated in FIGS. 5 and 10, the position detection line portions 40 are routed such that a first end of each position detection line portion 40 is connected to one end of the drive electrode 39. A second end of the position detection line portion 40 is connected to the CF board-side contact 42. A large portion of the position detection line portion 40 extends along the Y-axis direction (the first direction) perpendicular to the extending direction of the drive electrode 39. Specifically, each position detection line portion 40 includes a first line 40a, a second line 40b, and a third line 40c. The first line 40a is connected to one end of the drive electrode 39. The second line 40b extends from the first line 40a along the Y-axis direction. The third line 40c has a planar shape that includes a bent portion to extend from the second line 40b to the CF board-side contact 42. The width of the position detection line portion 40 decreases in stepwise as approaching from the drive electrode 39 to the CF board-side contact 42. The width of the first line 40a is about equal to the width of the drive electrode 39 and the width of the second line 40b is smaller than the width of the first line 40a. The position detection line portion 40 extends from the corresponding drive electrode 39 to the CF board-side contact 42. Therefore, the position detection line portion 40 closer to the CF board-side contact 42 has a smaller length and the position detection line portion 40 farther from the CF board-side contact 42 has a larger length.

The position detection line portions 40 are formed from the metal film 46 that forms the drive electrodes 39 and arranged in the same layer as the drive electrodes 39 on the inner surface of the CF board 11a. Because the position detection line portions 40 are formed from the metal film 46, the wire resistances are sufficiently low. Therefore, the signals transmitted to the drive electrodes 39 are less likely to become dull. The position detection line portions 40 are formed from the metal film 46 and thus less likely to have light transmissivity. However, the position detection line portions 40 are arranged on the CF board 11a in the non-display area NAA. Therefore, the display quality is less likely to be subject to adverse effect.

As illustrated in FIGS. 5 and 10, the position detection line portions 40 are arranged to sandwich the drive electrodes 39 in the direction in which the drive electrodes 39 extend. Namely, the position detection line portions 40 are arranged in the non-display areas NAA (non-touch areas) on the right side and the left side of the display area AA (the touch area) with respect to the X-axis direction. The position detection line portions 40 are arranged to overlap the monolithic circuits 37 on the array board 11b in the non-display areas NAA in the plan view. Even if noise is generated from the monolithic circuits 37, the noise can be blocked by the multiple position detection line portions 40. Therefore, the position detection performance of the touchscreen pattern is less likely to decrease. On one of sides with respect to the direction in which the drive electrodes 39 extend, the position detection line portions 40 that overlap a first monolithic circuit 37 of the monolithic circuits 37 (e.g., one on the right in FIG. 5) are connected to first ends of the drive electrodes 39. On the other one of sides with respect to the direction in which the drive electrodes 39 extend, the position detection line portions 40 that overlap a second monolithic circuit 37 of the monolithic circuits 37 (e.g., one on the left in FIG. 5) are connected to the second ends of the drive electrodes 39. The drive electrodes 39, the first ends of which are connected to first position detection line portions 40, and drive electrodes 39, the second ends of which are connected to second position detection line portions 40, are alternately arranged along the Y-axis direction. More specifically, the drive electrodes 39 in odd lines from the CF board-side contact 42 with respect to the Y-axis direction are connected to the position detection line portions 40 on the other one of sides and the drive electrodes 39 in even lines are connected to the position detection line portions 40 on one of sides.

As illustrated in FIGS. 5 and 10, on the inner surface of the CF board 11a in the non-display area NAA, dummy lines 47 are formed adjacent to the ends of the drive electrodes 39 to which the position detection line portions 40 are not connected with respect to the X-axis direction. Each of the dummy lines 47 has a dimension in the Y-axis direction about equal to the width of the drive electrode 39 (a dimension in the Y-axis direction). The dummy lines 47 are provided for the drive electrodes 39 that are arranged along the X-axis direction, respectively. Specifically, some of the dummy lines 47 are arranged adjacent to the second ends of the drive electrodes 39 that are connected to the first position detection line portions 40 and other dummy lines 47 are arranged adjacent to the first ends of the drive electrodes 39 that are connected to the second position detection line portions 40. Each dummy line 47 is arranged in an area defined by the drive electrodes 39 adjacent with respect to the X-axis direction and the second line 40b of the position detection line portion 40 adjacent to the dummy line 47 farther from the CF board-side contact 42 with respect to the Y-axis direction. The dummy line 47 has a dimension in the X-axis direction is smaller than a distance between the drive electrode 39 and the second line 40b that sandwich the dummy line 47. In comparison between the dummy line 47 closer to the CF board-side contact 42 and dummy line 47 farther from the CF board-side contact 42 with respect to the Y-axis direction, the dimension of the dummy line 47 closer to the CF board-side contact 42 in the X-axis direction is smaller than the dimension of the dummy line 47 farther from the CF board-side contact 42. The dummy lines 47 are formed from the metal film 46 that forms the drive electrodes 39 and the position detection line portions 40 in the same layer on the inner surface of the CF board 11a in which the drive electrodes 39 and the position detection line portions 40 are formed. It is preferable to set a distance between the dummy line 47 and the adjacent second line 40b in a range from 3 μm to 100 μm.

The dummy lines 47 are arranged to overlap the monolithic circuits 37 on the array board 11b in the non-display areas NAA in the plan view. Specifically, the dummy lines 47 adjacent to the first ends of the drive electrodes 39 and connected to the second ends of the position detection line portions 40 overlap the first monolithic circuit 37 and the dummy lines 47 adjacent to the second ends of the drive electrodes 39 connected to the first ends of the position detection line portions 40 overlap the second monolithic circuit 37 in the plan view. The dummy lines 47 (except for the farthest one from the CF board-side contact 42) are arranged to fill gaps between ends of the drive electrodes 39 opposite from the ends connected to the position detection line portions 40 and the second lines 40b of the position detection line portions 40 adjacent thereto with respect to the X-axis direction. The dummy lines 47 are connected to the ends of the adjacent drive electrodes 39 with respect to the X-axis direction, that is, the ends of the drive electrodes 39 which are not connected to the position detection line portions 40. Even if noise is produced from the monolithic circuits 37, the position detection line portions 40 and the dummy lines 47 block the noise with high efficiency. In the production process, the metal film 46 that forms the drive electrodes 39, the position detection line portions 40, the CF board-side contacts 42, and the dummy lines 47 is formed on the inner surface of the CF board 11a and patterned. Then, continuity inspection pads included in a continuity inspection apparatus may be applied to the CF board-side contacts 42 and the dummy lines 47 to pass currents. Whether or not defectives such as broken lines are present in the drive electrodes 39 and the position detection line portions 40 are determined. Namely, the dummy lines 47 can be used for the continuity inspection for the drive electrodes 39 and the position detection line portions 40. The dummy lines 47 do not contribute to the position inputting function.

Figure 11:
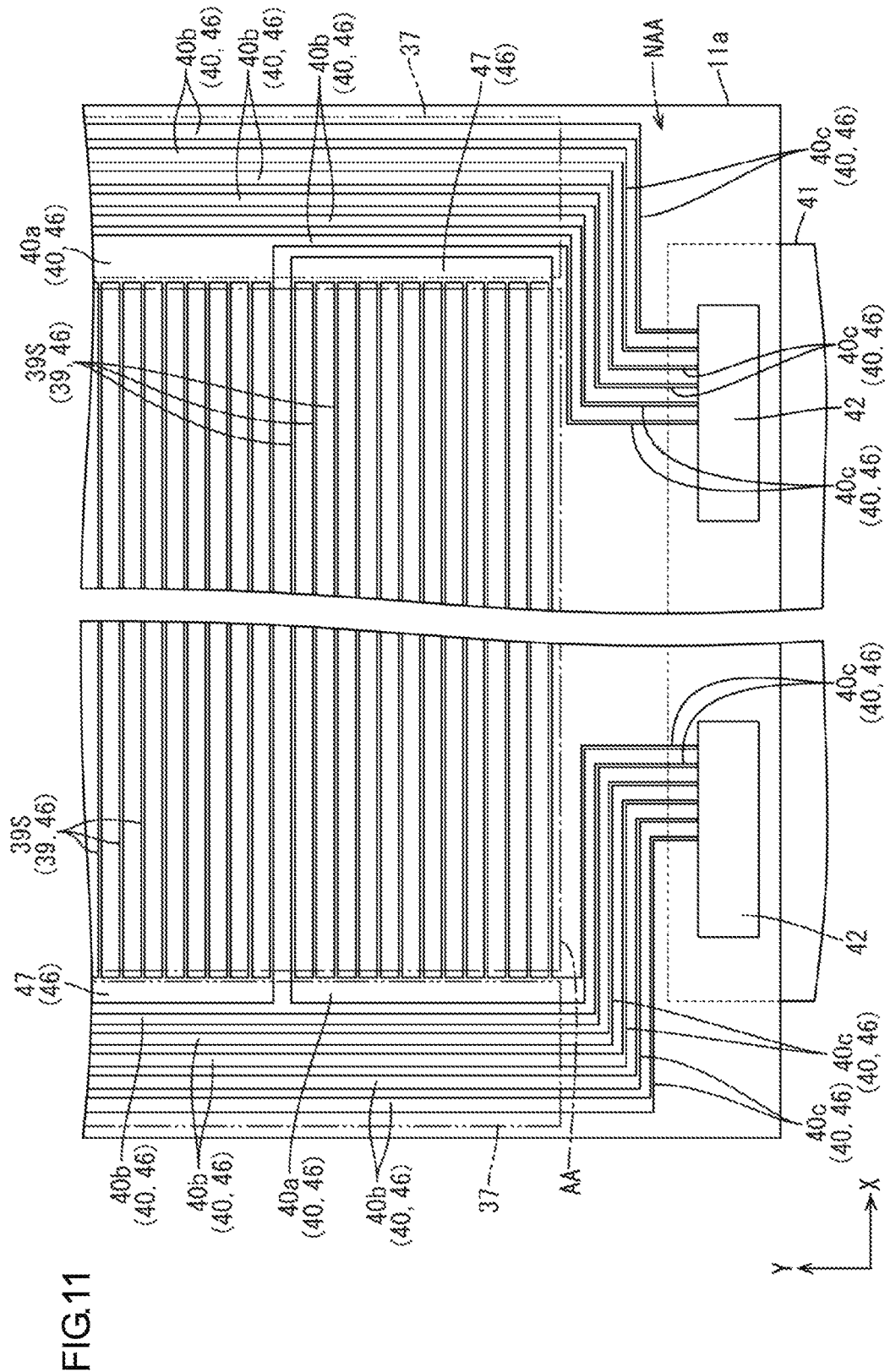
FIG. 11 is a magnified bottom view of the portions of the CF board at the ends with respect to the short-side direction at an end with respect to the long-side direction on the terminal portion side.

As illustrated in FIGS. 10 and 11, the widths of the second lines 40b of the position detection line portions 40 are different from one another according to the drive electrodes 39 to which the position detection line portions 40 are connected. Specifically, the widths of the first lines 40a of the position detection line portions 40 are substantially constant regardless of the drive electrodes 39 to which the position detection line portions 40 are connected. The widths of the second lines 40b and the third lines 40c connected to the drive electrodes 39 closer to the CF board-side contacts 42 are smaller and the widths of the second lines 40b that are connected to the drive electrodes 39 that are farther from the CF board-side contacts 42 are larger. The lengths of the position detection line portions 40 that are connected to the drive electrodes 39 that are farther from the CF board-side contacts 42 are longer than the lengths of the position detection line portions 40 that are connected to the drive electrodes 39 that are closer to the CF board-side contacts 42. Therefore, the wire resistances tend to be higher. By setting the widths of the second lines 40b larger as described above, the line resistances can be reduced. According to the configuration, differences in wire resistance between the position detection line portions 40 that are connected to the drive electrodes 39 that are farther from the CF board-side contacts 42 and the position detection line portions 40 that are connected to the drive electrodes 39 that are closer to the CF board-side contacts 42 can be reduced. Therefore, the position detection performance is less likely to be reduced. The dimensions of the first lines 40a of the position detection line portions 40 in the Y-axis direction (widths) are substantially constant. The X-dimensions of the first lines 40a that are connected to the drive electrodes 39 that are closer to the CF board-side contacts 42 are smaller.

Next, various films formed in layers on the inner surface of the CF board 11a (on the liquid crystal layer 11c side, on the opposed surface side to the array board 11b) by a known photolithography method will be described. As illustrated in FIGS. 7 and 8, the CF board 11a includes a layer of the light blocking portion 25 and the color filters 24, the metal film 46, and the planarization film 26 formed in layers in this sequence from the lower side (from the glass substrate, on the front side). Although not illustrated, the alignment film is formed over the planarization film 26. In this embodiment, although not illustrated, photo spacers having a columnar shape on the planarization film 26 on the upper layer side. The photo spacers protrude toward the array board 11b to penetrate through the liquid crystal layer 11c. The photo spacers are for maintaining a cell gap in mainly in the display area AA at constant.

As illustrated in FIGS. 7 and 8, the light blocking portion 25 is formed on the front surface of the glass substrate GS of the CF board 11a across the display area AA and the non-display area NAA. The light blocking portion 25 may be made of photosensitive resin with a light blocking material (e.g., carbon black) added thereto and thus have high light blocking properties. Sections of the light blocking portion 25 in the display area AA form a grid pattern in the plan view. Sections of the light blocking portion 25 in the non-display area NAA form a frame form in the plan view. The pattern of the light blocking portion 25 in the display area AA is formed with traces that extend along the Y-axis direction and traces that extend along the X-axis direction connected to one another. As illustrated in FIG. 12, the traces define the pixel portions PX. Specifically, the traces of the light blocking portion 25 extending along the Y-axis direction are arranged at intervals to correspond to the short dimensions of the pixel portions PX in the X-axis direction (intervals with respect to the X-axis direction) in the display area AA. The traces of the light blocking portion 25 along the X-axis direction are arranged at intervals to correspond to the long dimensions of the pixel portions PX in the Y-axis direction (intervals with respect to the Y-axis direction) in the display area AA. As illustrated in FIGS. 7 and 8, the color filters 24 are arranged in the display area AA and formed in the island pattern that corresponds to the arrangement of the pixel electrodes 20 on the array board 11b, which will be described later. The color filters 24 may be made of photosensitive resin with pigments for coloring. Specifically, the color filters 24 include a large number of color portions that are two-dimensionally arranged in a matrix on the CF board 11a at positions to overlap the pixel electrodes 20 on the array board 11b in the plan view in the display area AA. Each of the color portions has a vertically-long rectangular in the plan view (not illustrated). The color filters 24 includes lines of the color portions that exhibit red, green, and blue, respectively. The color portions are repeatedly arranged along the row direction (the X-axis direction). The lines of the color portions are arranged along the column direction (the Y-axis direction). In the display area AA, the adjacent color portions are separated from each other with the traces of the light blocking portion 25 for reducing color mixture between the pixel portions PX. The metal film 46 is formed above the light blocking portion 25. The metal film 46 is formed in a stripe pattern that overlaps the traces of the light blocking portion 25 along the X-axis direction in the display area AA to form the drive electrodes 39 (FIG. 12). Portions of the metal film 46 arranged in the non-display area NAA form the position detection line portions 40, the CF board-side contacts 42, and the dummy lines 47. The planarization film 26 is formed over the light blocking portion 25, the color filters 24, and the metal film 46 and in a solid pattern across the display area AA and the non-display area NAA. The planarization film 26 may be made of acrylic resin such as polymethylmethacrylate resin (PMMA). The surface of the CF board 11a on the liquid crystal layer 11c side (on which the alignment film is formed) is properly planarized with the planarization film 26. The planarization film 26 covers the drive electrodes 39, the position detection line portions 40, and the dummy lines 47 that are formed from the metal film 46 from the array board 11b side.

This embodiment has the configuration described above. Effects will be described next. When the user of the liquid crystal display device 10 having the above configuration perform operation for inputting position information, that is, touch operation based on an image displayed in the display area AA of the liquid crystal panel 11, a capacitance between the detection electrode 38 and the drive electrode 39 at an intersection the closest to the input position (the touch position) within the display surface of the liquid crystal panel 11 varies. Therefore, by determining the detection electrode 38 and the drive electrode 39 between which the capacitance has varied, the input position can be detected.

Signals are transmitted from the touchscreen controller to the drive electrodes 39 via the flexible circuit board 17, the array board-side contacts 43, the CF board-side contacts 42, and the position detection line portions 40. The signals are input to the drive electrodes 39 to scan the drive electrodes 39 in sequence from the farthest from the CF board-side contacts 42 to the closest to the CF board-side contacts 42. The detection electrodes 38 output signals related to intensity of electric fields generated by the drive electrodes 39 to the touchscreen flexible circuit board 41. The signals output to the touchscreen flexible circuit board 41 are transmitted to the touchscreen controller. The touchscreen controller identifies the detection electrode 38 that generates the electric field, the intensity of which has varied. The touchscreen controller then identifies the drive electrode 39 that generates the electric field, the intensity of which has varied, based on timing at which the intensity of the electric field has varied. The input position is determined based on positions of the detection electrodes 38 and the drive electrodes 39 that are identified by the touchscreen controller.

The position of input by the user can be detected as described above. However, electromagnetic waves that may be noise to the touchscreen pattern may be generated by the monolithic circuits 37 of the array board 11b in the non-display area NAA during the image display in the display area AA of the liquid crystal panel 11. The noise may adversely affect the position detection performance of the touchscreen pattern. As illustrated in FIGS. 3 and 5, the position detection line portions 40 and the dummy lines 47 are formed on the inner surface of the CF board 11a in the non-display area NAA to overlap the monolithic circuits 37 and thus the nose generated by the monolithic circuits 37 is efficiently blocked. Therefore, a reduction in position detection performance of the touchscreen pattern due to the noise generated by the monolithic circuits 37 is less likely to occur.

As described above, the liquid crystal display device 10 (the display device with a position inputting function) according to this embodiment includes the array board 11b, the CF board 11a (the common board), the detection electrodes 38 (the first position detection electrodes), the drive electrodes 39 (the second position detection electrodes), and the position detection line portions 40. The array board 11b includes the display circuit that includes at least the TFTs 19 (the display components) in the display area AA in which images are displayed and the monolithic circuits 37 (the component drivers) in the non-display area NAA in which no image is displayed for driving the TFTs 19. The CF board 11a is opposed to the array board 11b with the gap between the CF board 11a and the array board 11b. The detection electrodes 38 are formed on the plate surface (the outer surface) of the CF board 11a facing away from the array board 11b in the display area AA to extend along the first direction (the Y-axis direction) along the plate surface. The drive electrodes 39 are formed on the plate surface (the inner surface) of the CF board 11a facing the array board 11b to extend along the plate surface and the second direction (the X-axis direction) perpendicular to the first direction. The position detection line portions 40 are formed on the plate surface of the CF board 11a facing the array board 11b in the non-display area NAA. The position detection line portions 40 are connected to the drive electrodes 39 for transmitting signals to the drive electrodes 39. The position detection line portions 40 overlap the monolithic circuits 37.

According to the configuration, images are displayed by the TFTs 19 and the monolithic circuits 37 of the display circuit included in the array board 11b. The CF board 11a is opposed to the array board 11b with the gap. The CF board 11a includes the detection electrodes 38 on the plate surface facing away from the array board 11b and the drive electrodes 39 on the plate surface facing the array board 11b in the display area AA. The detection electrodes 38 extend along the first direction. The drive electrodes 39 extend along the second direction perpendicular to the first direction. Furthermore, the CF board 11a includes the position detection line portions 40 on the plate surface facing the array board 11b in the non-display area NAA. The position detection line portions 40 are connected to the drive electrodes 39 for transmitting the signals to the drive electrodes 39. According to the configuration, the positions of input by the user can be detected based on the variations in capacitance between the detection electrodes 38 and the drive electrodes 39.

The drive electrodes 39 are formed on the plate surface of the CF board 11a facing the array board 11b that includes the display circuit. The CF board 11a is opposed to the array board 11b with the gap. In comparison to the configuration in which the drive electrodes 39 are included in the array board 11b, the drive electrodes 39 are located farther from the display circuit. According to the configuration, the interference is less likely to occur between the display circuit and the drive electrodes 39. Therefore, the signals for the position detection are less likely to become dull. If components of the display circuit of the array board 11b are used as the drive electrodes, the period for image display and the period for position detection need to be chronologically shifted. Because the drive electrodes 39 are independent from the display circuit in the CF board 11a, the period for image display and the period for position detection can overlap each other. Therefore, the period for image display and the period for position detection can be set longer. This configuration is for preferable for increasing the definition and the screen size. Furthermore, the position detection line portions 40 are arranged to overlap the monolithic circuits 37. Therefore, even if the noise is generated by the monolithic circuits 37, the noise is blocked by the position detection line portions 40. According to the configuration, the position detection performance is less likely to decrease.

The monolithic circuits 37 sandwich the drive electrodes 39 from the sides with respect to the second direction. Some of the position detection line portions 40 are connected to the first ends of the drive electrodes 39 with respect to the second direction and arranged to overlap the first monolithic circuit 37. The dummy lines 47 are formed on the plate surface of the CF board 11a facing the array board 11b in the non-display area NAA and connected to the second ends of the drive electrodes 39 with respect to the second direction. The dummy lines 47 are arranged to overlap the second monolithic circuit 37. Because some of the position detection line portions 40 are connected to the first ends of the drive electrodes 39 with respect to the second direction and arranged to overlap the first monolithic circuit 37, the first the monolithic circuit 37 is shielded. The dummy lines 47 are connected to the second ends of the drive electrodes 39 which are not connected to the position detection line portions 40. The dummy lines 47 are arranged to overlap the second monolithic circuit 37. Therefore, the second monolithic circuit 37 is shielded. According to the configuration, the monolithic circuits 37 that sandwich the drive electrodes 39 from the side with respect to the second direction are shielded. Furthermore, electrical performance of the drive electrodes (e.g., continuity) can be inspected using the dummy lines 47.

The drive electrodes 39 are arranged along the first direction. Some of the position detection line portions 40 are connected to the first ends of the drive electrodes 39 and arranged to overlap the first monolithic circuit 37. Some of the position detection line portions 40 are connected to the second ends of the drive electrodes 39 and arranged to overlap the second monolithic circuit 37. Some of the dummy lines 47 are connected to the second ends of the drive electrodes 39 and arranged to overlap the second monolithic circuit 37. Some of the dummy lines 47 are connected to the first ends of the drive electrodes 39 and arranged to overlap the first monolithic circuit 37. Because some of the drive electrodes 39 arranged along the first direction include the first ends to which the position detection line portions 40 are connected and some of the drive electrodes 39 include the second ends to which the position detection line portions 40 are connected, a larger space can be provided for each position detection line portion 40 in comparison to a configuration in which the position detection line portions 40 are connected to the first ends of all of the drive electrodes 39. Therefore, each position detection line portion 40 can have a larger width and thus higher sensitivity can be achieved in the position detection. The first monolithic circuit 37 is arranged to overlap the position detection line portions 40 connected to the first ends of the drive electrodes 39 and the dummy lines 47 connected to the first ends of the drive electrodes 39. The second monolithic circuit 37 is arranged to overlap the position detection line portions 40 connected to the second ends of the drive electrodes 39 and the dummy lines 47 connected to the second ends of the drive electrodes 39. According to the configuration, each monolithic circuit 37 is properly shielded.

Furthermore, the pixel portions PX that exhibit the colors different from one another and the light blocking portion 25 that separates the adjacent pixel portions PX are provided. The detection electrodes 38 are formed from the transparent electrode film. The drive electrodes 39 are formed from at least the metal film and arranged to overlap the sections of the light blocking portion 25. Because the drive electrodes 39 are formed from at least the metal film, the resistances of the drive electrodes 39 are sufficiently low. Furthermore, the drive electrodes 39 that are formed from the metal film are arranged in the display area AA to overlap the sections of the light blocking portion 25 that separates the adjacent pixel portions PX. Therefore, the drive electrodes 39 are less likely to adversely affect the image display in the display area AA. Because the detection electrodes 38 are formed from the transparent electrode film, the detection electrodes 38 are less likely to adversely affect the image display in the display area AA.

The light blocking portion 25 includes the sections that extend in the first direction and the sections that extend in the second direction to form the grid pattern. The drive electrodes 39 include the drive electrode segments 39S (the second position detection electrode segments) separated from one another and arranged at intervals corresponding to the dimensions of the pixel portions PX along the first direction. The drive electrode segments 39S are arranged to overlap the sections of the light blocking portion extending along the second direction. Because the drive electrode segments 39S that extend in the second direction are arranged at intervals corresponding to the dimensions of the pixel electrodes PX in the first direction to overlap the sections of the light blocking portion, which is formed in the grid pattern, extending in the second direction. According to the configuration, a reduction in the aperture rate of the pixel portions PX is less likely to occur while the wire resistances of the drive electrodes are properly maintained at low levels. Therefore, the image display is less likely to receive an adverse effect.

The drive electrodes 39 are arranged to overlap the light blocking portion 25 on the array board 11b side. According to the configuration, the ambient light that enters from the CF board 11a side is blocked by the light blocking portion 25 before reaching the drive electrodes 39. Therefore, the drive electrodes 39 are less likely to reflect the ambient light and thus light reflected by the drive electrodes 39 is less likely to be recognized. According to the configuration, high display quality can be achieved.

The drive electrodes 39 are arranged along the first direction. The position detection lines 40 are connected to the first ends of the drive electrodes 39 with respect to the second direction. The position detection lines 40 are arranged along the second direction to extend in the first direction. The CF board-side contacts 42 (the signal supplying portions) are formed in the end portion of the plate surface of the CF board 11a facing the array board 11b in the non-display area NAA at one of the ends with respect to the first direction. The CF board-side contacts 42 are connected to the position detection lines 40 for supplying the signals. The position detection lines 40 connected to the drive electrodes 39 farther from the CF board-side contacts 42 with respect to the first direction have the widths larger than the widths of the position detection lines 40 connected to the drive electrodes 39 closer to the CF board-side contacts 42. Creepage distances of the position detection lines 40 connected to the drive electrodes 39 farther from the CF board-side contacts 42 with respect to the first direction tend to be larger than creepage distances of the position detection lines 40 connected to the drive electrodes 39 closer to the CF board-side contacts 42 with respect to the first direction. However, because of the large widths, the wire resistances are less likely to increase. According to the configuration, the difference in the wire resistance, which may be produced between the position detection lines 40 connected to the drive electrodes 39 farther from the CF board-side contacts 42 with respect to the first direction and the position detection lines 40 connected to the drive electrodes 39 closer to the CF board-side contacts 42 with respect to the first direction can be reduced. Therefore, the position detection performance is less likely to decrease.

The floating electrodes 45 are formed on the plate surface of the CF board 11a facing away from the array board 11b. The floating electrodes 45 are formed from the transparent electrode film and arranged between the detection electrodes 38 adjacent to each other with respect to the second direction. Because the floating electrodes 45 that are formed from the transparent electrode film are arranged between the detection electrodes 38 adjacent to each other with respect to the second direction in the display area AA, the light transmissivity of the detection electrodes 38 and the light transmissivity of the areas between the detection electrodes 38 adjacent to each other with respect to the second direction are about equal to each other. Therefore, the display area AA has even light transmissivity. According to the configuration, higher display quality can be achieved.

<Second Embodiment>

A second embodiment of the present invention will be described with reference to FIG. 13. The second embodiment includes ground electrodes 48 on an outer surface of a CF board 111a in the non-display area NAA. Configurations, functions, and effects similar to those of the first embodiment will not be described.

Figure 13:
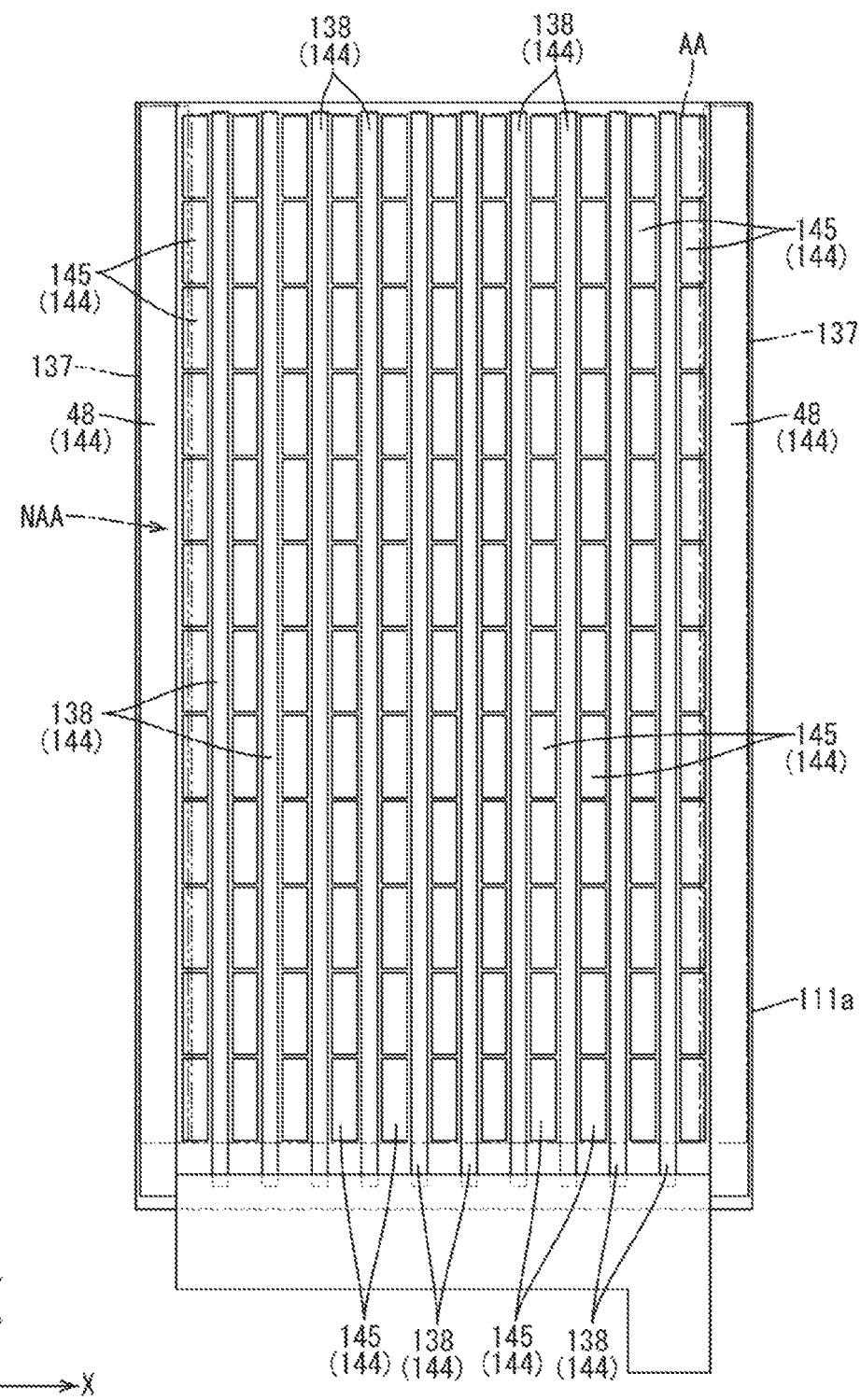
FIG. 13 is a plan view of a CF board included in a liquid crystal panel according to a second embodiment of the present invention.

As illustrated in FIG. 13, the ground electrodes 48 are formed on the outer surface of the CF board 111a according to this embodiment in the non-display area (non-touching area). The ground electrodes 48 are formed from a transparent electrode film 144 that forms detection electrodes 138 and floating electrodes 145. The ground electrodes 48 are formed in a layer in which the detection electrodes 138 and the floating electrodes 145 are formed on the outer surface of the CF board 111a. The ground electrodes 48 are arranged to sandwich a group of the detection electrodes 138 and the floating electrodes 145 from the sides with respect to the X-axis direction. Namely, the ground electrodes 48 are arranged in sections of the non-display area NAA on the right and the left of the display area AA (the touching area), that is, to sandwich the display area AA with respect to the X-axis direction. The ground electrodes 48 are arranged to overlap monolithic circuits 137 formed on an array board (not illustrated) in the non-display area NAA in a plan view. According to the configuration, even if noise is generated by the monolithic circuit 137, the noise can be blocked by the ground electrodes 48. Therefore, position detection performance of the touchscreen pattern is less likely to decrease. Furthermore, the ground electrodes 48 are arranged to overlap position detection line portions (not illustrated) in the plan view. According to the configuration, unnecessary capacitance coupling is less likely to occur between the position detection line portions and the detection electrodes 138. Therefore, the position detection performance is further less likely to decrease.

As describe above, in this embodiment, the ground electrodes 48 formed from the transparent electrode film 144 are formed on the plate surface of the CF board 11a facing away from the array board in the non-display area NAA. The ground electrodes 48 are arranged to overlap the monolithic circuits 137 and the position detection line portions. Because the ground electrodes 48 are arranged to overlap the position detection line portions, unnecessary capacitance coupling is less likely to occur between the position detection line portions and the detection electrodes 138. Therefore, the position detection performance is further less likely to decrease.

<Third Embodiment>

A third embodiment of the present invention will be described with reference to FIGS. 14 or 15. The third embodiment includes a light blocking portion 225 and drive electrodes 239 having configurations altered from those of the first embodiment according to arrangement of photo spacers 49. Configurations, functions, and effects similar to those of the first embodiment will not be described.

Figure 14:
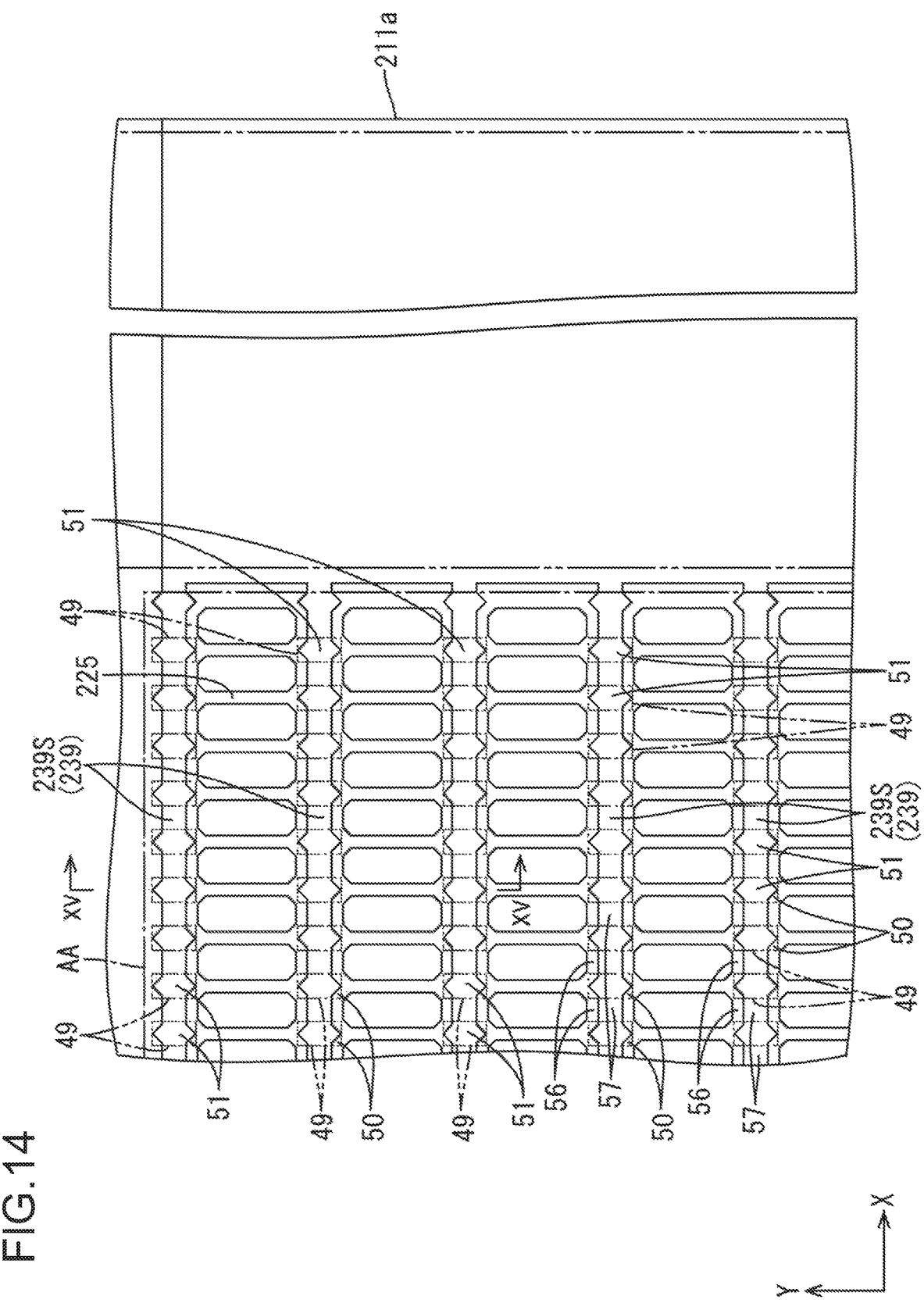
FIG. 14 is a magnified bottom view of end portions of a CF board included in a liquid crystal panel according to a third embodiment of the present invention.
Figure 15:
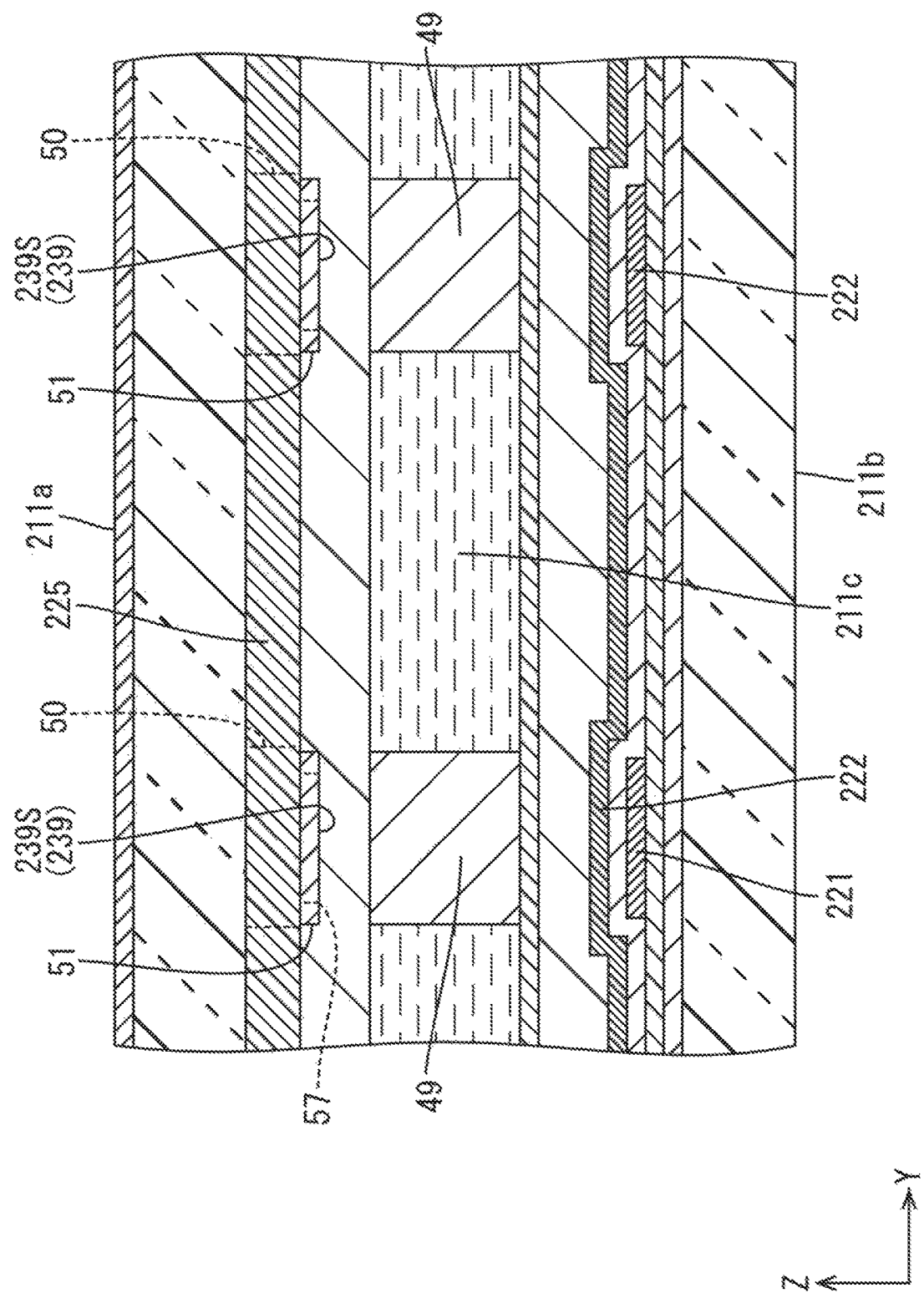
FIG. 15 is a cross-sectional view along line xv-xv in FIG. 14.

As illustrated in FIGS. 14 and 15, a liquid crystal panel 211 includes photo spacers 49 (spacers) for maintaining a thickness of a liquid crystal layer 211c (a cell gap) in the display area AA. The photo spacers 49 are formed on a planarization film 226 in a CF board 211a. Each photo spacer 49 has a columnar shape and penetrates the liquid crystal layer 211c. The photo spacers 49 include distal ends that are in contact with the array board 211b. The photo spacers 49 are formed at predefined positions within the display area AA by patterning a resin film with a known photolithography method. Specifically, the photo spacers 49 are formed at intersections between gate lines 221 and source lines 222 within the display area AA. The photo spacers 49 are arranged to overlap a light blocking portion 225 and drive electrodes 239 in a plan view. More specifically, the photo spacers 49 are arranged such that the center of each photo spacer 49 is aligned with the center of the corresponding intersection of the light blocking portion 225. In the display area AA, alignment of liquid crystal molecules in the liquid crystal layer 211c may be difficult in areas where the photo spacers 49 are formed. Therefore, the display quality may decrease. Sections of the light blocking portion 225 corresponding to the areas where the photo spacers 49 are formed are expanded in comparison to other sections (no spacer arrangement sections). The sections are defined as expanded light blocking sections 50 (spacer arrangement sections). With the expanded light blocking sections 50, the decrease in display quality resulting from the photo spacers 49 is less likely to occur.

Sections of drive electrode segments 239S of the drive electrodes 239 corresponding to the areas in which the photo spacers 49 are formed are expanded in comparison to other sections (no spacer arrangement sections). The sections are defined as expanded drive electrode sections 51 (spacer arrangement sections). The expanded drive electrode sections 51 are arranged to overlap the expanded light blocking sections 50 in the plan view. A width of each expanded drive electrode section 51 is smaller than a width of each expanded light blocking section 50. Although the expanded drive electrode sections 51 have the width larger than the width of the other sections of the drive electrode segments 239S, the entire areas of the expanded drive electrode sections 51 are covered with the expanded light blocking sections 50 to block light. Therefore, the expanded drive electrode sections 51 are less likely to be recognized by the user. A total area of the drive electrode segments 239S and the drive electrodes 239 is larger than that of the first embodiment because the drive electrode segments 239S have the wide sections in the areas in which the photo spacers 49 are formed. According to the configuration, higher sensitivity is achieved in the position detection. In FIG. 15, the light blocking portion 225 and the expanded drive electrode sections 51 of the drive electrode segments 239S are depicted with solid lines. The expanded light blocking sections 50 and the other sections of the drive electrode segments 239S smaller than the expanded drive electrode sections 51 are depicted with broken lines.

As described above, this embodiment includes the photo spacers 49 (the spacers) between the array board 211b and the CF board 211a. The photo spacers 49 are arranged to overlap the light blocking portion 225 and the drive electrodes 239. The light blocking portion 225 and the drive electrodes 239 include the no spacer arrangement sections in which the photo spacers 49 are not arranged. The light blocking portion 225 and the drive electrodes 239 include the expanded light blocking sections 50 and the expanded drive electrode sections 51 (the spacer arrangement sections), respectively. The spacer arrangement sections have the widths larger than the widths of the no spacer arrangement sections. Because the drive electrodes 239 include the expanded light blocking sections 50 and the expanded drive electrode sections 51 having the widths larger than the widths of the no spacer arrangement sections, the drive electrodes 239 have larger areas. Therefore, higher sensitivity is achieved in the position detection. The expanded light blocking sections 50 and the expanded drive electrode sections 51 have the widths larger than the widths of the no spacer arrangement sections. The photo spacers 49 are formed in the areas corresponding to the expanded light blocking sections 50 of the light blocking portion 225 and the expanded drive electrode sections 51 of the drive electrodes 239 between the array board 211b and the CF board 211a. Therefore, the expanded drive electrode sections 51 of the drive electrodes 239 are less likely to adversely affect the image display in the display area AA.

<Fourth Embodiment>

A fourth embodiment will be described with reference to FIGS. 16 to 18. The fourth embodiment includes a planarization film 326 that includes holes 52 at positions overlapping dummy lines 347. Configurations, functions, and effects similar to those of the first embodiment will not be described.

Figure 16:
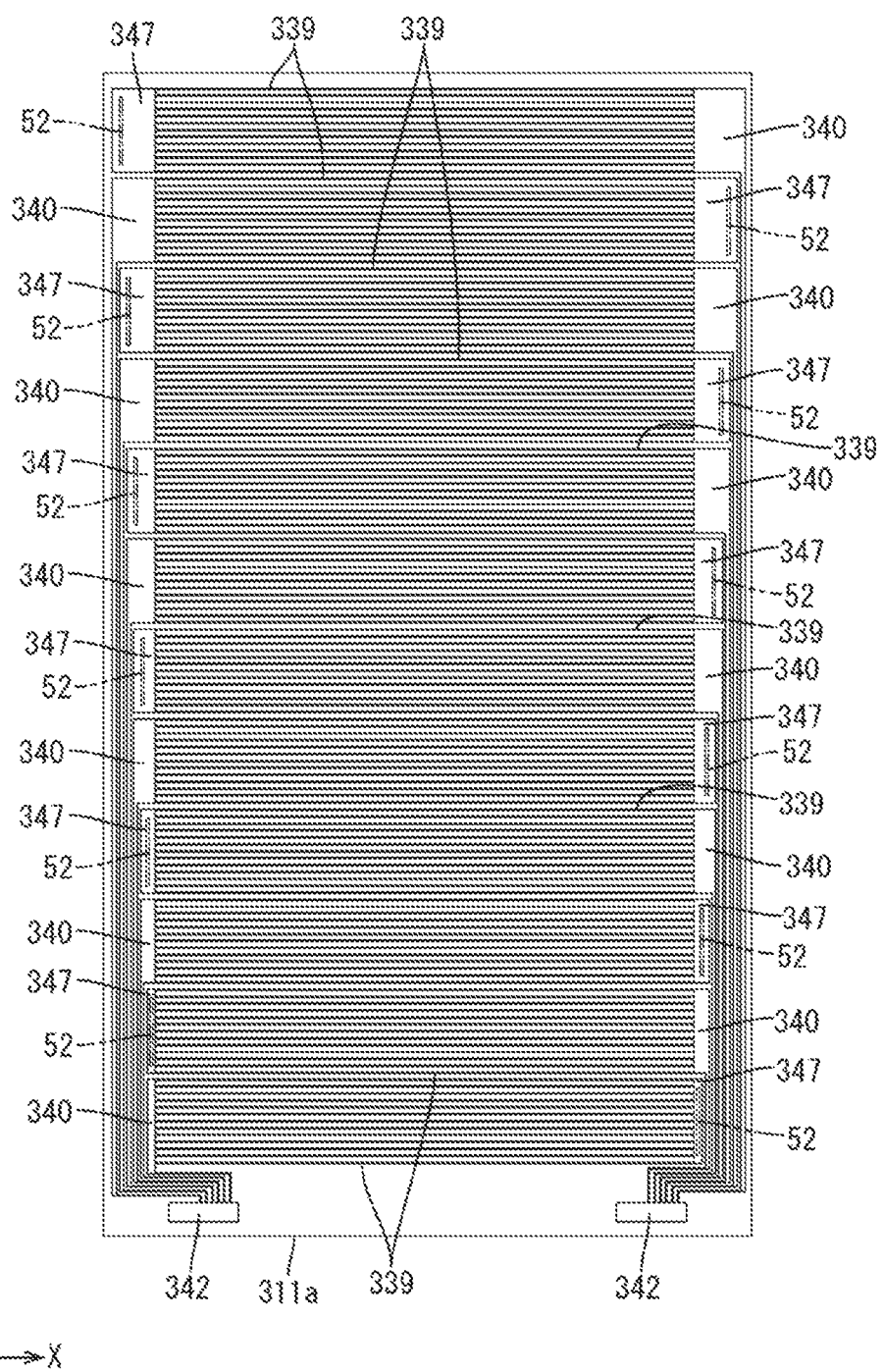
FIG. 16 is a bottom view of a CF board included in a liquid crystal panel according to a fourth embodiment of the present invention.
Figure 17:
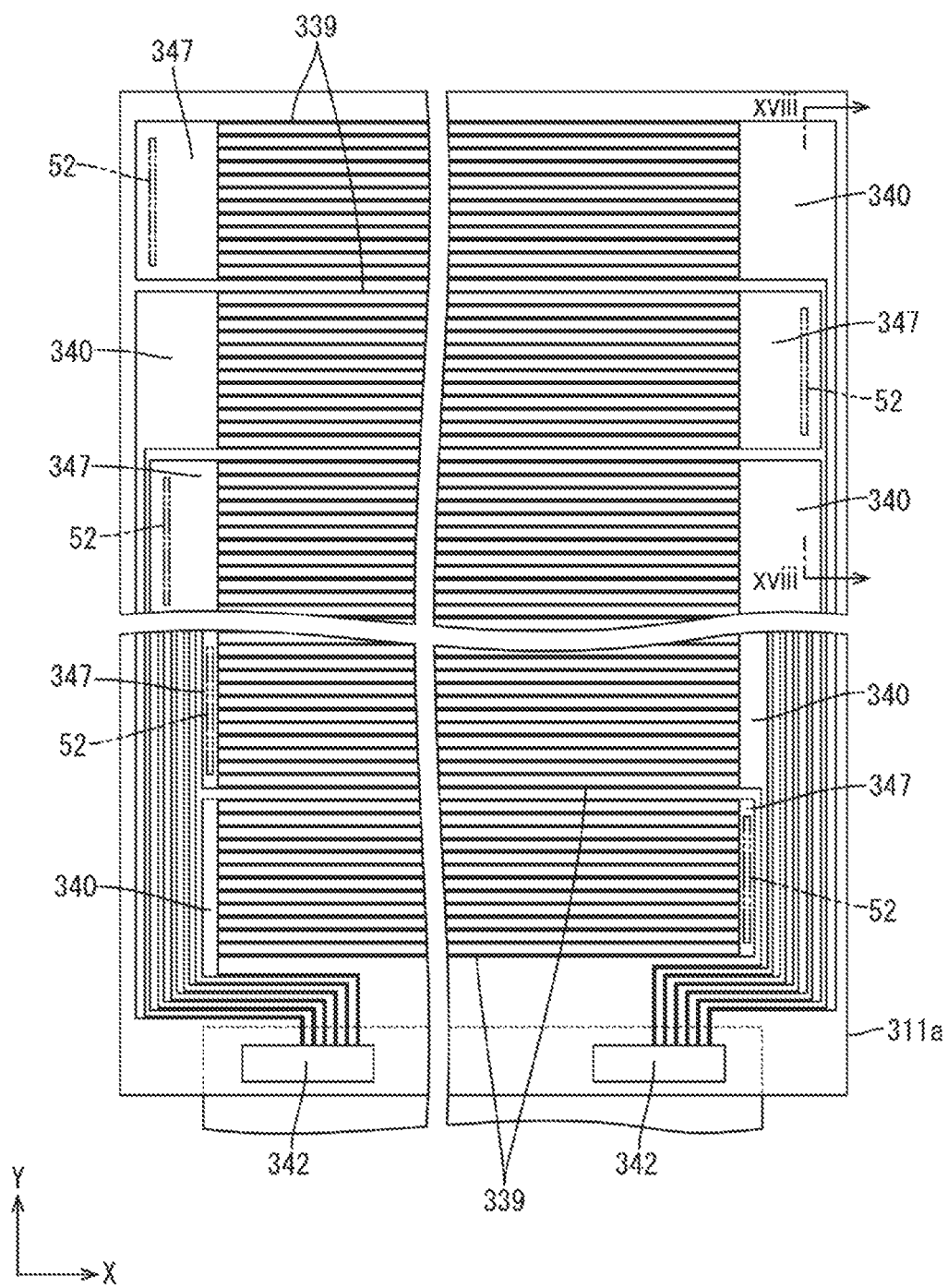
FIG. 17 is a magnified bottom view of end portions of a CF board.
Figure 18:
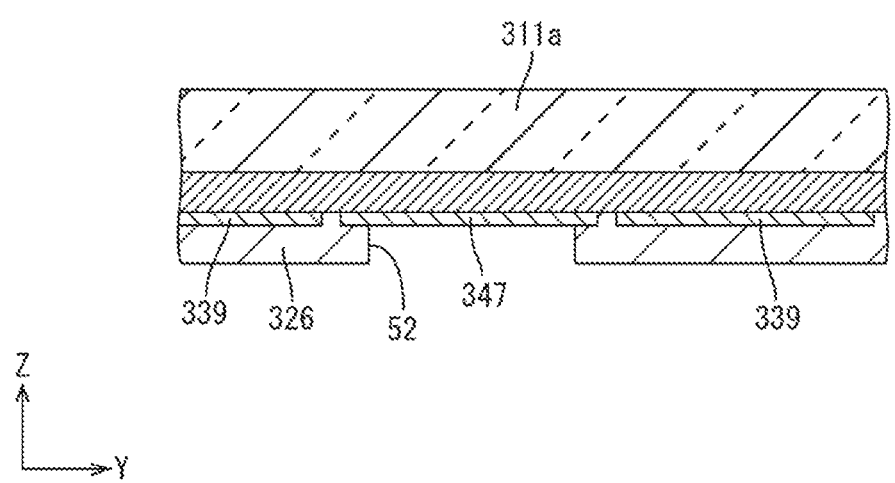
FIG. 18 is a cross-sectional view along line xviii-xviii in FIG. 17.

As illustrated in FIGS. 16 to 18, the planarization film 326 of a CF board 311a in this embodiment includes holes 52 at positions corresponding to the dummy lines 347. Each hole 52 has a vertically-long rectangular shape in a plan view with a long dimension smaller than dimensions of the dummy lines 347 in the Y-axis direction. The holes 52 are through holes that run through in a thickness direction of the planarization film 326. Sections of the dummy lines 347 are exposed to the outside through the holes 52. According to configuration, the continuity inspection pads of the continuity inspection apparatus can be applied to the dummy lines 347 through the holes 52 in the planarization film 326 that are formed and patterned in the production of the CF board 311a. Namely, after completion of the production of the CF board 311a and before attachment of the array board, continuity between drive electrodes 339 and position detection line portions 340 can be inspected by electrically connecting CF board-side contacts 342 to the dummy lines 347.

As described above, this embodiment includes the planarization film 326 (a protective film) which covers the drive electrodes 339, the position detection line portions 340, and the dummy lines 347 from the array board side. The planarization film 326 includes the holes 52 at the positions corresponding to the dummy lines 347. According to the configuration, the drive electrodes 339, the position detection line portions 340, and the dummy lines 347 can be protected with the planarization film 326. The inspection apparatus can be connected to the dummy lines 347 through the holes 52 in the planarization film 326 at the positions corresponding to the dummy lines 347. Therefore, the inspection of the drive electrodes 339 can be performed after the planarization film 326 is formed in the production.

<Fifth Embodiment>

A fifth embodiment will be described with reference to FIGS. 19 to 22. The fifth embodiment includes a light blocking portion 425 and drive electrodes 439 that are formed in layers that are in an opposite sequence from the first embodiment. Furthermore, each drive electrode 439 has a multilayer structure of a metal film 446 and a transparent electrode film 53. Configurations, functions, and effects similar to those of the first embodiment will not be described.

Figure 19:
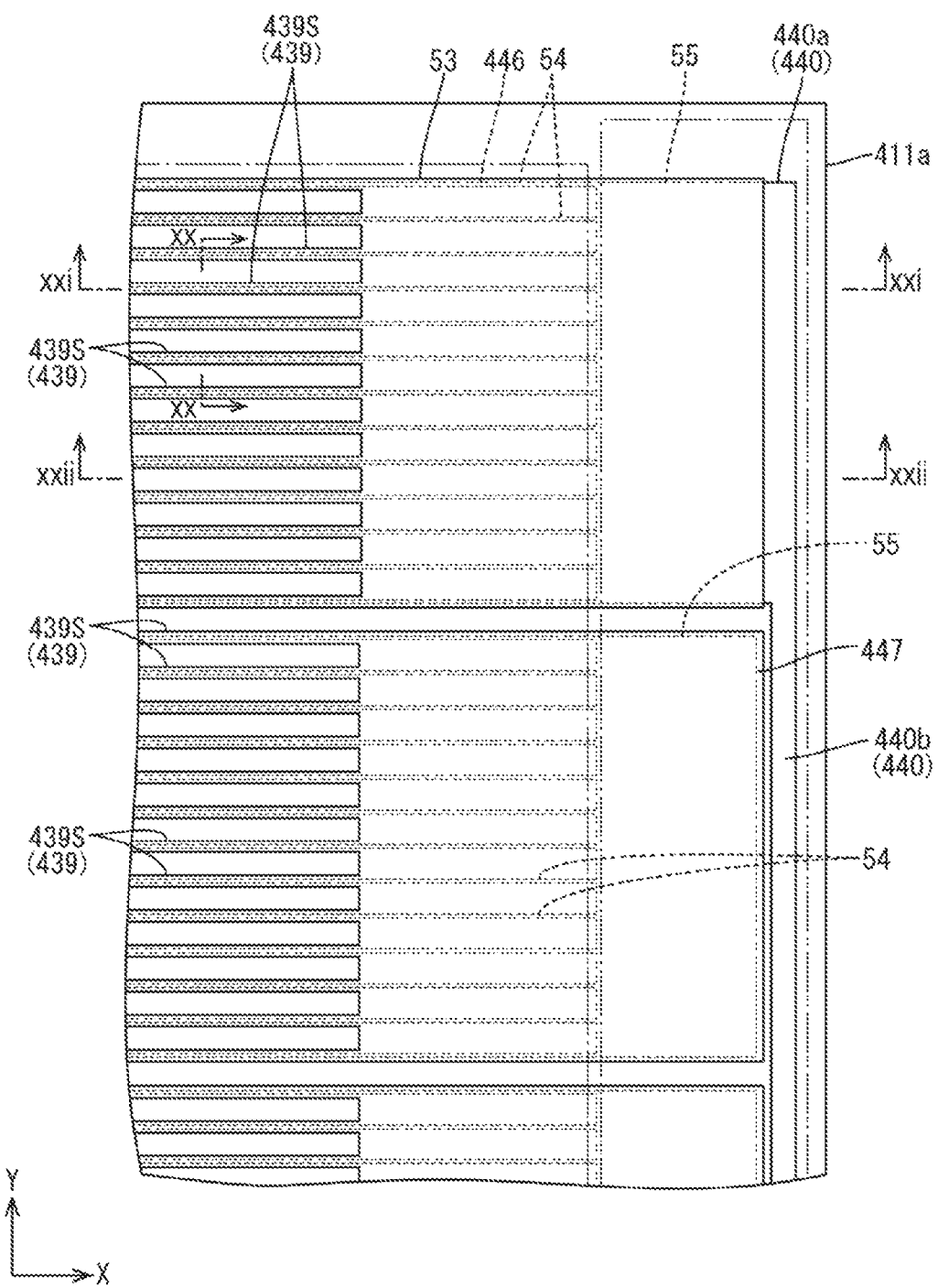
FIG. 19 is a magnified bottom view of end portions of a CF board includes in a liquid crystal panel according to a fifth embodiment of the present invention.
Figure 20:
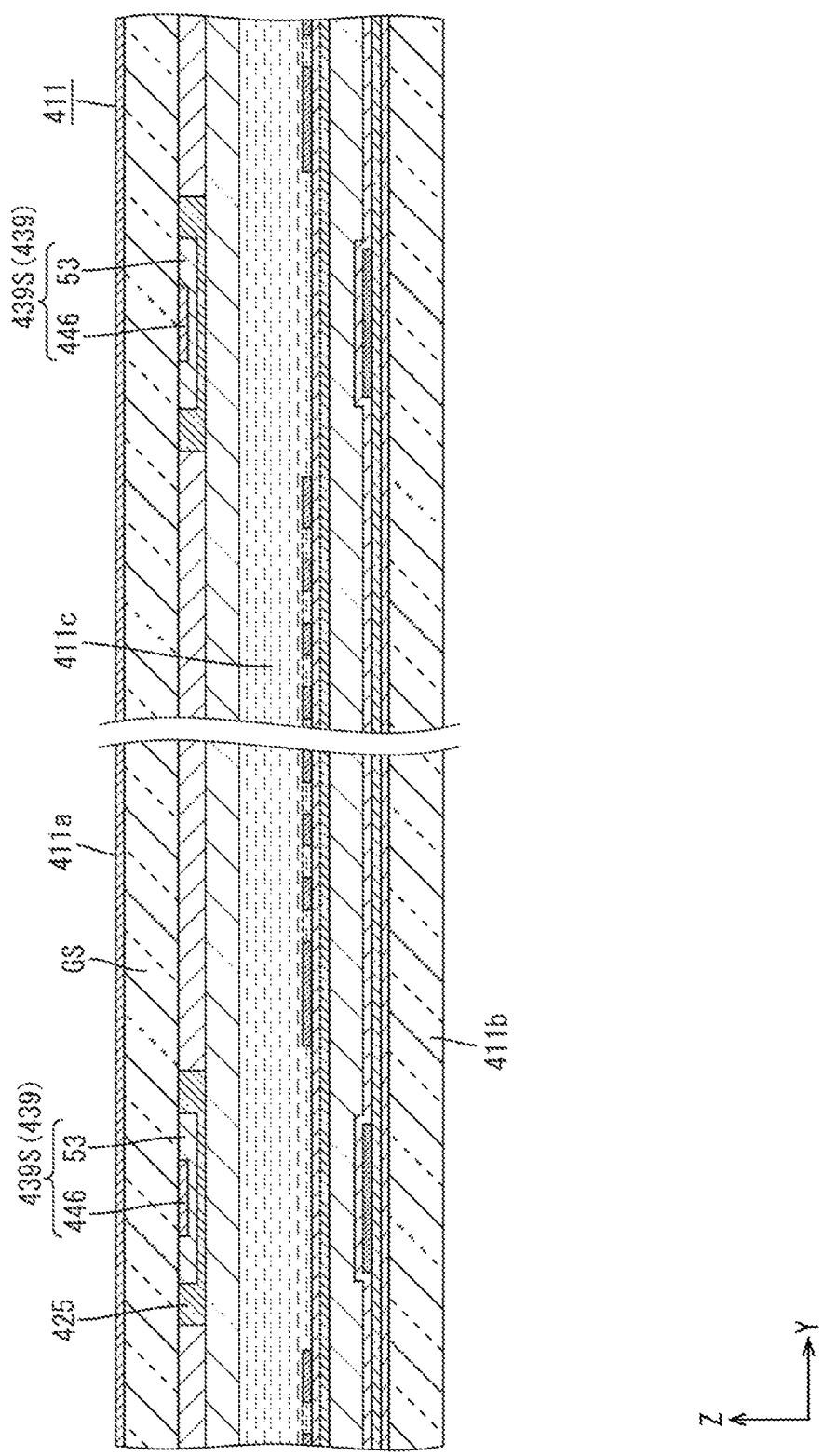
FIG. 20 is a cross-sectional view along line xx-xx in FIG. 19.

As illustrated in FIGS. 19 and 20, the drive electrodes 439 are formed on an inner surface of a glass substrate GS of a CF board 411a in this embodiment. The light blocking portion 425 is formed over the drive electrodes 439 on an upper layer side (a liquid crystal layer 411c side, an array board 411b side). Namely, the layers that include the light blocking portion 425 and the drive electrodes 439 are formed in a sequence apposite from the sequence of the layers in the first embodiment. Each drive electrode 439 has the multilayer structure of the metal film 446 and the transparent electrode film 53. The metal film 446 is in the lower layer (on the CF board 11a side) and the transparent electrode film 53 is in the upper layer. Because the metal film 446 that forms the drive electrodes 439 can be formed directly on the inner surface of the glass substrate GS of the CF board 411a, the metal film 446 can be formed and patterned with high precision. Namely, the drive electrodes 439 can be formed at the proper positions and in the proper two-dimensional shape. In FIG. 19, the transparent electrode film 53 that forms the drive electrodes 439 is depicted with a solid line and the metal film 446 that form the drive electrodes 439 is depicted with a broken line.

The drive electrodes 439 include drive electrode segments 439S. Portions of the drive electrode segments 439S formed from the metal film 446 have a width smaller than a width of portions of the drive electrode segments 439S formed from the transparent electrode film 53. The portions formed from the metal film 446 are entirely covered with the portions formed from the transparent electrode film 53 from above. The widths of the portions of the drive electrode segments 439S formed from the transparent electrode film 53 are about equal to the widths of the drive electrode segments 39S in the first embodiment. Namely, the widths of the portions of the drive electrode segments 439S formed from the metal film 446 are smaller than the widths of the drive electrode segments 39S in the first embodiment. The metal film 446 is directly formed on the inner surface of the glass substrate GS of the CF board 411a and the light blocking portion 425 is not arranged under the metal film 446. Therefore, the ambient light may be directly reflected by the metal film 446 resulting in a decrease in display quality. With the metal film 446 that forms the drive electrode segments 439S having the widths smaller than the widths of the drive electrode segments 39S in the first embodiment, even if the ambient light is reflected by the metal film 446, the reflected light is less likely to be recognized. Therefore, the display quality is less likely to decrease. By reducing the width of each drive electrode segment 439S, the total area of the drive electrode segments 439S and the drive electrodes 439 may decrease. With the drive electrode segments 439S with the multilayer structure of the metal film 446 and the transparent electrode film 53 having the width about equal to the width of the drive electrode segments 39S in the first embodiment, the total area of the drive electrode segments 439S and the drive electrodes 439 can be maintained about equal to that of the first embodiment. According to the configuration, the sensitivity in the position detection can be maintained at a sufficiently high level.

Figure 21:
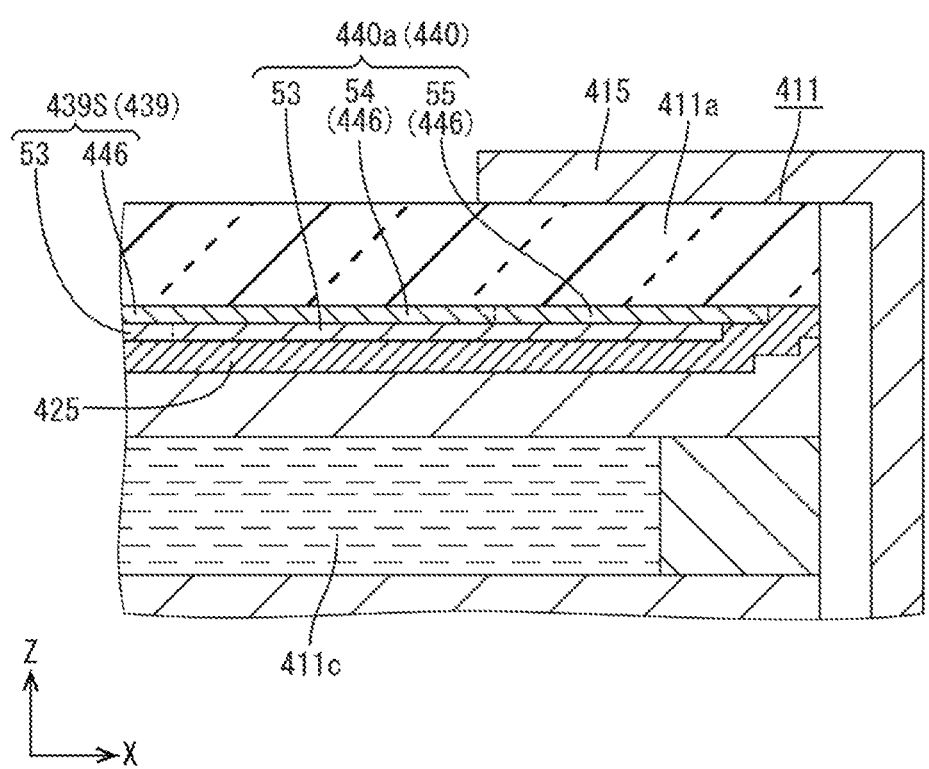
FIG. 21 is a cross-sectional view along line xxi-xxi in FIG. 19.
Figure 22:
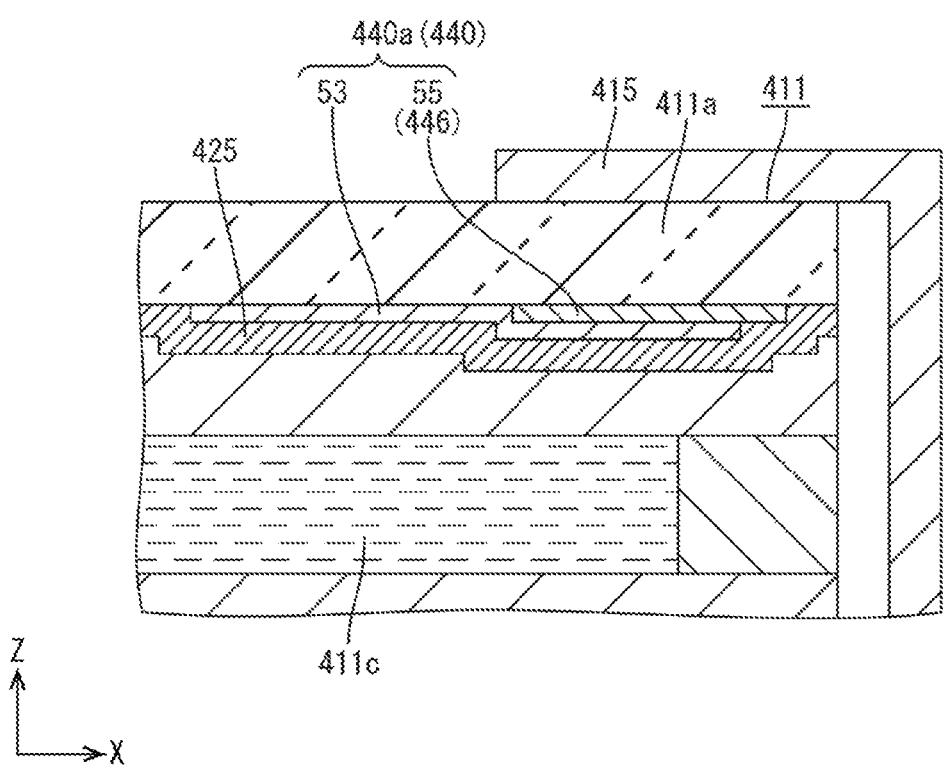
FIG. 22 is a cross-sectional view along line xxii-xxii in FIG. 19.

As illustrated in FIGS. 19, 21, and 22, sections of position detection line portions 440 and the entire dummy lines 447 have the multilayer structures of the metal film 446 and the transparent electrode film 53. The metal film 446 is in the upper layer and the transparent electrode film 53 is in the lower layer. Specifically, large sections of first lines 440a of the position detection line portions 440 excluding end sections closer to the second lines 440b (including end portions closer to the drive electrodes) have the multilayer structures of the metal film 446 and the transparent electrode film 53. The ends of the first lines 440a closer to the second lines 440b, the second lines 440b, and third lines (not illustrated) have single layer structures of the metal film 446.

The sections of the first lines 440a of the position detection line portions 440 include narrow sections 54 and wide sections 55. Each narrow section 54 has a width equal to the width of the section of the drive electrode segment 439S formed from the metal film 446. Each wide section 55 has a width equal to the width of the first line 440a. The wide sections 55 are connected with the narrow sections 54. The sections of the dummy lines 447 formed from the metal film 446 include narrow sections 54 and wide sections 55. Each narrow section 54 has a width equal to the width of the section of the drive electrode segment 439S formed from the metal film 446. Each wide section 55 has a width equal to the width of the dummy line 447. The wide sections 55 are connected with the narrow sections 54. The narrow sections 54 are arranged to overlap the light blocking portion 425 and not to overlap a bezel 415 in a plan view. The bezel 415 holds down a liquid crystal panel 411 from the front side for holding the liquid crystal panel 411. Although the narrow sections 54 formed from the metal film 446 are not covered with the bezel 415, the narrow sections have the widths about equal to the widths of the sections of the drive electrode segments 439S formed from the metal film 446. Therefore, even if the ambient light is reflected by the narrow sections 54, the reflected light is less likely to be recognized. The wide sections 55 are formed in the areas covered with the bezel 415. Namely, the wide sections 55 formed from the metal film 446 are covered with the bezel 415 from the front side. Therefore, the ambient light is less likely to reach the wide sections 55 and thus less likely to be reflected by the wide sections 55.

The width of the section of the first line 440a of each position detection line portion 440 formed from the transparent electrode film 53 is equal to the width of the first line 440a for the entire length. Similarly, the section of each dummy line 447 formed from the transparent electrode film 53 is equal to the width of the dummy line 447 for the entire length. The sections of the first lines 440a and the dummy lines 447 formed from the transparent electrode film 53 are arranged in areas between the narrow sections 54 that are sections of the first lines 440a and the dummy lines 447 formed from the metal film 446. The sections of the first lines 440a and the dummy lines 447 formed from the transparent electrode film 53 are formed to cross the narrow sections 54 that are arranged along the Y-axis direction. According to the configuration, the areas of the first lines 440a and the dummy lines 447 are about equal to the lines of the first lines 40a and the dummy lines 47 in the first embodiment. Therefore, the sensitivity in the position detection is about equal to that of the first embodiment.

As described above, the drive electrodes 439 in this embodiment are arranged to overlap the light blocking portion 425 on the CF board 411a side. In comparison to a configuration in which drive electrodes are arranged to overlap the light blocking portion 425 on the array board 411b side, the drive electrodes 439 are formed on a base that is more planar. Therefore, patterning of the drive electrodes 439 can be performed with higher precision.

The drive electrodes 439 have the multilayer structure of the metal film 446 and the transparent electrode film 53 that is formed over the metal film 446. The ambient light that has entered from the CF board 411a side directly reaches the drive electrodes 439 that are arranged to overlap the light blocking portion 425 on the CF board 411a side. If the drive electrodes are formed only from the metal film 446, the widths of the drive electrodes 439 need to be significantly reduced to reduce the amount of light reflected by the drive electrodes 439. As described above, the drive electrodes 439 have the multilayer structure of the metal film 446 and the transparent electrode film 53. Even if the widths of the metal film 446 are significantly reduced to reduce the amount of reflected light, the drive electrodes 439 can have sufficient areas by increasing the width of the transparent electrode film 53 that is less likely to have the reflected light problem while reducing the amount of the reflected light. When the drive electrodes 439 have the sufficient areas, sufficient sensitivity can be achieved in the position detection.

The ends of the position detection line portions 440 connected at least to the drive electrodes 439 have the multilayer structure of the metal film 446 and the transparent electrode film 53 that is formed over the metal film 446. The position detection line portions 440 are arranged in the non-display area NAA. However, if the ambient light that has entered from the CF board 411a side and reaches the ends of the position detection line portions 440 connected to the drive electrodes 439 is reflected, the display quality may decrease. If the position detection lines are formed only from the metal film 446, the width of the ends of the position detection line portions 440 connected at least to the drive electrodes 439 need to be significantly reduced to reduce the amount of light reflected by the position detection line portions 440. As described above, the ends of the position detection line portions 440 connected at least to the drive electrodes 439 have the multilayer structure of the metal film 446 and the transparent electrode film 53. Even if the width of the metal film 446 is significantly reduced to reduce the amount of reflected light, the position detection line portions 440 can have sufficient areas by increasing the width of the transparent electrode film 53 that is less likely to have the reflected light problem while reducing the amount of the reflected light. When the position detection line portions 440 have the sufficient areas, sufficient sensitivity can be achieved in the position detection.

The bezel 415 (the holding member) is provided to hold the CF board 411a from the side opposite from the array board 411b side. The bezel 415 is disposed to overlap at least the outer edge portion of the non-display area NAA. At least sections of the position detection line portions 440 which do not overlap the bezel 415 have the multilayer structure of the metal film 446 and the transparent electrode film 53. The ambient light that has entered from the CF board 411a side and travels toward the sections of the position detection line portions 440 which do not overlap the bezel 415 is less likely to be blocked by the bezel 415. Furthermore, the portions have the multilayer structure of the metal film 446 and the transparent electrode film 53. Therefore, the detection lines 440 have the sufficient areas while reducing the amount of the reflected light.

<Sixth Embodiment>

A sixth embodiment will be described with reference to FIGS. 23 and 24. The sixth embodiment includes color filters 524 having configurations different from those of the first embodiment. Configurations, functions, and effects similar to those of the first embodiment will not be described.

Figure 23:
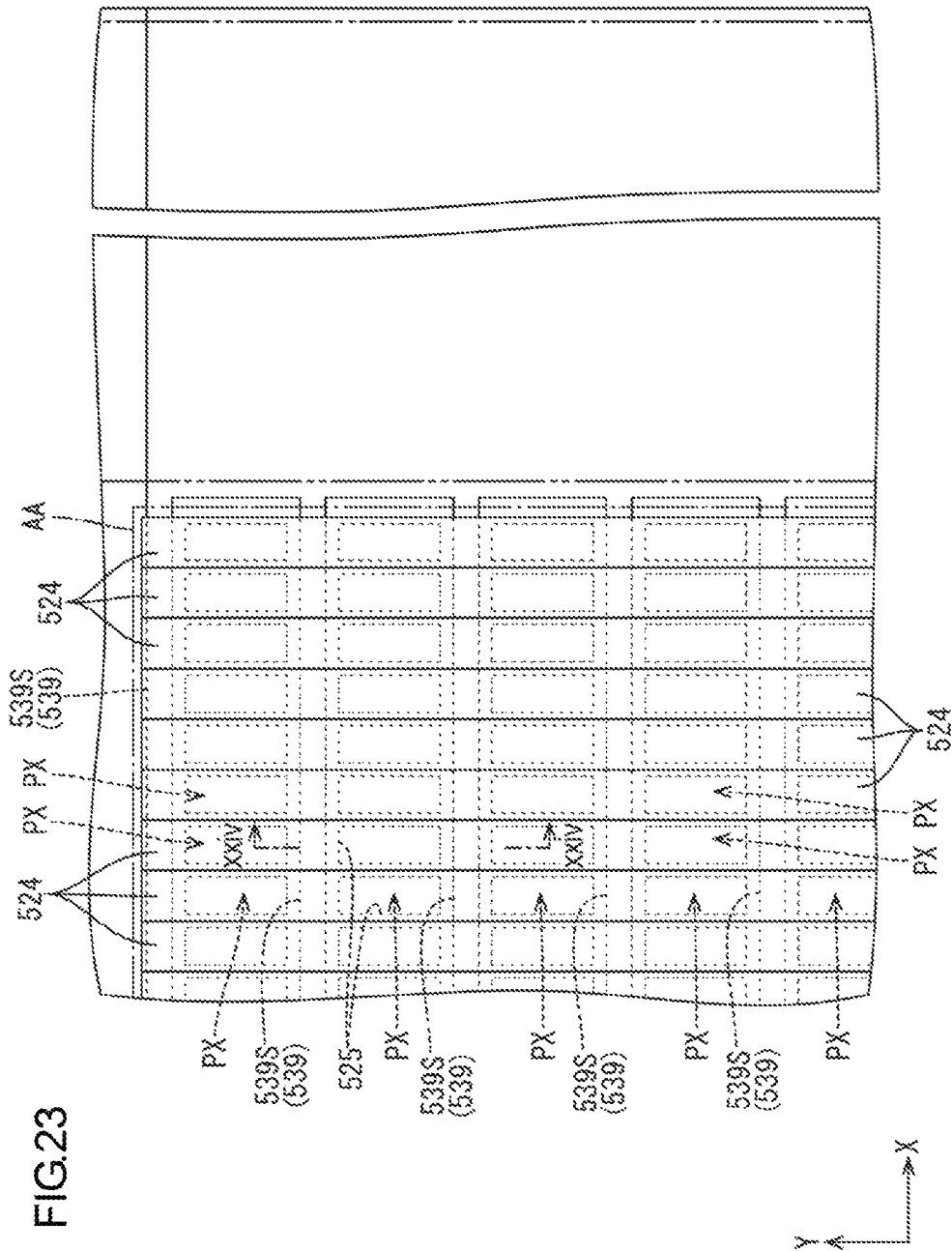
FIG. 23 is a magnified bottom view of portions of a CF board included in a liquid crystal panel according to a sixth embodiment of the present invention at ends with respect to short-side direction at an end with respect to a long-side direction opposite from a terminal portion side.

As illustrated in FIGS. 23 and 24, the color filters 524 include three colors of color portions that extend along the Y-axis direction (the first direction). The color portions are formed over the forming areas of the respective pixel portions PX. The color portions of the color filters 524 that extend along the Y-axis direction cross and overlap sections of a light blocking portion 525 (the portion that separates the pixel portions PX) which extend along the X-axis direction (the second direction) on an upper layer side (an array board 511b side, a liquid crystal layer 511c side, a side opposite from a glass substrate GS side of a CF board 511a). More specifically, the color portions of the color filters 524 extend for an about entire dimension of the display area AA in the Y-axis direction. The color portions of the color filters 524 are opposed to pixel electrodes 520 including a large number of (or all of) the pixel electrodes 520 that are arranged along the Y-axis direction. Therefore, the pixel portions PX exhibit red, green, and blue. The color portions of the color filters 524 extend along the Y-axis direction, that is, the color portions are not divided into small sections such as the first embodiment in which the color portions of the color filters 24 are surrounded by the sections of the light blocking portion 25 formed in the grid pattern, respectively (see FIGS. 7 and 8). Therefore, the forming of the color portions by patterning is easier. This configuration is preferable for increasing the definition. The color portions of the color filters 524 extending along the Y-axis direction are formed to overlap the sections of the light blocking portion 525 extending along the Y-axis direction on the upper layer side. The color portions that are adjacent to each other with respect to the X-axis direction and exhibit colors different from one another have edges that extend along the Y-axis direction and in contact with one another.

Drive electrode segments 539S included in drive electrodes 539 are arranged to overlap the sections of the light blocking portion 525 extending along the X-axis direction on the upper layer side. Furthermore, the drive electrode segments 539S are arranged to overlap the color portions of the color filters 524 on the lower layer side (the side opposite from the array board 511b side, the side opposite from the liquid crystal layer 511c side, the glass substrate GS side of the CF board 511a). The drive electrode segment 539S of the drive electrodes 539 are sandwiched between the sections of the light blocking portion 525 extending along the X-axis direction and the color portions of the color filters 524 with respect to the Z-axis direction (a direction normal to plate surfaces of the boards 511a and 511b). The color portions of the color filters 524 overlap the drive electrode segments 539S in addition to the sections of the light blocking portion 525 extending along the X-axis direction on the upper layer side. A planarization film 526 is formed to overlap the color portions of the color filters 524 on the upper layer side. The color portions of the color filters 524 and the planarization film 526 are formed over the drive electrode segments 539S of the drive electrodes 539. In comparison to the first embodiment, steps that may be formed on the surface of the CF board 511a (or the surface of the alignment film) when the drive electrode segments 539S are formed can be reduced. This configuration is preferable for leveling the surface of the CF board 511a. With the surface of the CF board 511a leveled, the orientations of the liquid crystal molecules in the liquid crystal layer 511c are less likely to be irregular. This configuration is preferable for improving contrast of images displayed in the display area AA and thus preferable for improving the display quality. The planarization film 526 is not illustrated in FIG. 23.

The color portions of the color filters 524 and the planarization film 526 are formed over the drive electrode segments 539S. In comparison to the first embodiment, distances between the drive electrode segments 539S and the pixel electrodes 520 that are formed on the array board 511b in the display area AA and connected to the TFTs (see FIGS. 6 and 7) are larger by the thickness of the color portions. Therefore, parasitic capacitances between the pixel electrodes 520 and the drive electrode segments 539S can be reduced and the sensitivity in the position detection improves. The drive electrode segments 539S of the drive electrodes 539 are arranged to overlap the sections of the light blocking portion 525 extending along the X-axis direction (the second direction). The widths of the sections of the light blocking portion 525 extending along the X-axis direction is larger than the widths of the sections of the light blocking portion 525 extending along the Y-axis direction. This is for blocking light around the TFTs (the display components). According to the configuration, the sufficient width can be set for each drive electrode segment 539S to improve the sensitivity in the position detection while maintaining a proper aperture rate of the pixel portions PX. The drive electrode segments 539S of the drive electrodes 539 may be formed from a single metal film or multiple layers of metal films.

In this embodiment, as described above, the pixel portions PX include the pixel electrodes 520 and the color filters 524. The pixel electrodes 520 are formed on the array board 511b in the display area AA and connected to the TFTs (the display components). The color filters 524 include the color portions that exhibit the different colors. The color portions are arranged on the CF board 511a (the common board) in the display area AA to overlap the pixel electrodes 520. The color portions of the color filters 524 are arranged to extend along the first direction (the Y-axis direction) and to cross the sections of the light blocking portion 525 extending along the second direction (the X-axis direction). Furthermore, the color portions are arranged to overlap the drive electrode segments 539S (the second position detection electrode segments) on the array board 511b side. Because the color portions of the color filters 524 are arranged to overlap the drive electrode segments 539S that are arranged to overlap the light blocking portion 525, steps that may be formed on the surface of the CF board 511a on the array board 511b side when the drive electrode segments 539S are formed can be reduced. This configuration is preferable for leveling the surface of the CF board 511a. In comparison to a configuration in which color portions of color filters are arranged only in areas defined by the sections of the light blocking portion 525 which form the grid pattern, the distances between the drive electrode segments 539S that are arranged to overlap the sections of the light blocking portion 525 extending along the second direction and the pixel electrodes 520 that are arranged on the array board 511b in the display area AA and connected to the TFTs are larger. Therefore, the parasitic capacitances between the pixel electrodes 520 and the drive electrode segments 539S can be reduced and thus the sensitivity in the position detection improves. Furthermore, the color portions of the color filters 524 extend along the first direction. In comparison to the configuration in which the color portions of the color filters are arranged only in the areas defined by the sections of the light blocking portion 525 which form the grid pattern, the color portions are not divided into small segments. Therefore, forming of the color portions by patterning can be easily performed. This configuration is preferable for increasing the definition.

<Other Embodiments>

The present invention is not limited to the embodiments, which have been described using the foregoing descriptions and the drawings. The following embodiments may be included in the technical scope of the present invention.

(1) In each of the above embodiments, the drive electrodes connected to the first position detection lines and the drive electrodes connected to the second position detection lines are alternately arranged with respect to the Y-axis direction. However, groups of the drive electrodes connected to the first position detection lines and groups of the drive electrodes connected to the second position detection lines may be alternately arranged with respect to the Y-axis direction.

(2) Other than other embodiment (1), the drive electrodes arranged along the Y-axis direction may be divided into two groups. The first position detection lines may be connected to the first group including the drive electrodes closer to the CF board-side contacts. The second position detection lines may be connected to the second group including the drive electrodes farther from the CF board-side contacts. Alternatively, the second position detection lines may be connected to the drive electrodes closer to the CF board-side contacts and the first position detection lines may be connected to the drive electrodes farther from the CF board-side contacts.

(3) The arrangement of the drive electrodes connected to the first position detection lines and the drive electrodes connected to the second position detection lines may be altered from that of other embodiments (1) or (2).

(4) In each of the above embodiments, the number of the first position detection lines that overlap the first monolithic circuit and the number of the dummy lines are equal to the number of the second position detection lines that overlap the second monolithic circuit and the number of the dummy lines, respectively. However, the numbers may be different from each other.

(5) In each of the above embodiments, the position detection lines and the dummy lines are arranged in the side sections of the non-display areas that sandwich the display area. However, the position detection lines may be arranged in one of the side sections of the non-display area on a side of the display area and the dummy lines may be arranged in another one of the side sections of the non-display area on the other side of the display area. In this case, the position detection lines may be arranged to overlap the first monolithic circuit and the dummy lines may be arranged to overlap the second monolithic circuit.

(6) In each of the above embodiments, the monolithic circuits, the position detection lines, and the dummy lines are arranged in the non-display areas that sandwich the display area with respect to the short-side direction of the liquid crystal panel. However, the monolithic circuits, the position detection lines, and the dummy lines may be arranged in the non-display areas that sandwich the display area with respect to the long-side direction of the liquid crystal panel.

(7) In each of the above embodiments, the widths of the second lines are set differently according to the positional relationship between the drive electrodes to which the second lines are connected and the CF board-side contacts. However, the widths of the second lines of the position detection lines may be equal to one another.

(8) The dimensions of the floating electrodes of the above embodiments in the plan view may be altered from that of each of the above embodiments. It is preferable that the lengths of the floating electrodes are smaller than the lengths of the detection electrodes. However, it is not mandatory.

(9) The forming areas of the ground electrodes in the second embodiment in the plan view can be altered as appropriate.

(10) The intervals of the photo spacers in the display area in the third embodiment may be altered as appropriate.

(11) The arrangement and the forming areas of the holes in the fourth embodiment within the dummy lines may be altered as appropriate.

(12) The forming areas of the metal film and the transparent electrode film that form the drive electrodes and the position detection lines in the plan view in the fifth embodiment may be altered as appropriate.

(13) Each of the above embodiments includes the liquid crystal panel that operates in FFS mode. The liquid crystal panel includes the array board that includes the pixel electrodes and the common electrodes. The pixel electrodes and the common electrodes overlap each other with the insulating film therebetween. However, the present invention can be applied to a liquid crystal panel that operates in VA mode. Such a liquid crystal panel includes an array board that includes pixel electrode and a CF board that includes common electrodes. The pixel electrodes and the common electrodes overlap each other with a liquid crystal layer therebetween. The present invention can be applied to a liquid crystal panel that operated in IPS mode.

(14) The dummy lines and the floating electrodes can be eliminated from the configuration of each of the above embodiments.

(15) In each of the above embodiments, the touch area of the touchscreen pattern and the display area of the liquid crystal panel correspond to each other. However, they may not completely correspond to each other. For example, the touch area of the touchscreen pattern may correspond to an entire area of the display area of the liquid crystal panel and a portion of the non-display area (a portion closer to the display area).

(16) The semiconductor film of each of the above embodiments is the CG silicon thin film (a polysilicon thin film). However, oxide semiconductor or amorphous silicon may be used for the material of the semiconductor film.

(17) In each of the above embodiments, the color filters of the liquid crystal panel are in three colors of red, green, and blue. However, the present invention may be applied to color filters including four color portions of red, green, blue, and yellow.

(18) Each of the above embodiments is the transmissive liquid crystal display device including the backlight unit, which is an external light source. However, the present invention may be applied to a reflective-type liquid crystal display device configured to display an image using ambient light. In this case, the backlight unit can be omitted. The present invention may be applied to a semitransmissive-type liquid crystal display device.

(19) Each of the above embodiments includes the liquid crystal panel categorized into the small size or the small-to-medium size liquid crystal panel used for various electronic devices including portable information terminals, mobile phones (including smartphones), notebook personal computers (including tablet personal computers), digital photo frames, and portable video game players. However, the present invention may be applied to medium-size or large-size (or supersize) liquid crystal panels having screen sizes in a range from 20 inches to 90 inches. Such liquid crystal panels may be used for electronic devices including television devices, digital signage, and electronic blackboards.

(20) Each of the above embodiments includes the liquid crystal panel including the liquid crystal layer sandwiched between the substrates. However, the present invention may be applied to a display panel including functional organic molecules other than the liquid crystals between substrates.

(21) Each of the above embodiments includes the TFTs as the switching components of the liquid crystal panel. The present invention can be applied to a liquid crystal display device including a liquid crystal panel including switching components other than the TFTs (e.g., thin film diodes (TFD)). The present invention can be applied to a liquid crystal display device including a liquid crystal panel for black-and-white display other than the liquid crystal display device including the liquid crystal panel for color display.

(22) Each of the above embodiments is the liquid crystal display device including the liquid crystal panel as the display panel. However, the present invention can be applied to display device including other types of display panels (plasma display panel (PDP), organic EL panels, electrophoretic panels (EPDs)). The backlight unit can be omitted.

EXPLANATION OF SYMBOLS

10: liquid crystal display device (display device including position inputting function), 11*a*, 111*a*, 211*a*, 311*a*, 411*a*, 511*a*: CF board (common board), 11*b*, 211*b*, 411*b*, 511*b*: array board, 15, 415: bezel (holding member), 19: TFT (display component, display circuit), 20, 520: pixel electrodes, 21, 221, 521: gate lines (display circuit), 22, 222: source lines (display circuit), 24, 524: color filter, 25, 225, 425, 525: light blocking portion, 26, 326, 526: planarization film (protective film), 37, 137: monolithic circuit (component driver), 38, 138: detection electrode (first position detection electrode), 39, 239, 339, 439, 539: drive electrode (second position detection electrode), 39S, 239S, 439S, 539S: drive electrode segment (second position detection electrode segment), 40, 340, 440: position detection line portion, 42, 342: CF board-side contact (signal supplying portion), 44, 144: transparent electrode film, 45, 145: floating electrode, 46, 446: metal film, 47, 347, 447: dummy line, 48: ground electrode, 49: photo spacer (spacer), 50: expanded light blocking section (spacer arrangement section), 51: expanded drive electrode section (spacer arrangement section), 52: hole, 53: transparent electrode film, AA: display area, NAA: non-display area, PX: pixel portion

The invention claimed is:

1. A display device with a position inputting function comprising:
    an array board comprising display components arranged in a display area for displaying an image and a display circuit arranged in a non-display area in which no image is displayed, the display circuit comprising at least component drivers for driving display components;
    a common board opposed to the array board with a gap between the common board and the array board;
    first position detection electrodes arranged on a plate surface of the array board extending along a vertical direction;
    second position detection electrodes arranged on a plate surface of the common board, each of the second position detection electrodes having a long dimension in a horizontal direction perpendicular to the vertical direction;
    position detection line portions arranged on the plate surface of the common board in the non-display area, the position detection line portions including first ends connected to the second position detection electrodes for transmitting signals to the second position detection electrodes and second ends connected to common board-side contacts; dummy lines arranged on the plate surface of the common board in the non-display area;
    the dummy lines including first ends connected to the second ends of the second position detection electrodes and second ends not connected to any components; and
    each of the dummy lines has a width in the vertical direction about equal to a width of the second position detection electrode; and
    each of the dummy lines and the position detection line portions are alternatively arranged in the vertical direction.

2. The display device with a position inputting function according to claim 1, wherein
    the component drivers are arranged to sandwich the second position electrodes with respect to the horizontal direction,
    the position detection line portions include position detection lines connected to the first ends of the second position detection electrodes with respect to the horizontal direction and arranged to overlap a first component driver of the component drivers,
    the display device further comprises the dummy lines arranged on the plate surface of the common board facing the array board in the non-display area, and
    the dummy lines are connected to the second ends of the second position detection electrodes with respect to the horizontal direction and arranged to overlap a second component driver of the component drivers.

3. The display device with a position inputting function according to claim 2, further comprising a protective film covering the second position detection electrodes, the position detection line portions, and the dummy lines from an array board side, wherein the protective film includes holes at positions overlapping the dummy lines.

4. The display device with a position inputting function according to claim 2, wherein
    the second position detection electrodes are arranged in the vertical direction, the position detection line portions include position detection lines that are connected to the first ends of the second position detection electrodes and arranged to overlap the first component driver and position detection lines that are connected to the second ends of the second position detection electrodes and arranged to overlap the second component driver,
    some of the dummy lines are connected to the second ends of the second position detection electrodes and arranged to overlap the second component driver and some of the dummy lines are connected to the first ends of the second position detection electrodes and arranged to overlap the first component driver.

5. The display device with a position inputting function according to claim 1, further comprising:
    pixel portions each exhibiting different colors; and
    a light blocking portion for separating the pixel portions from one another, wherein the first position detection electrodes are formed from a transparent electrodes film, and
    the second position detection electrodes are formed from at least a metal film and arranged to overlap sections of the light blocking portion.

6. The display device with a position inputting function according to claim 5, wherein
    the light blocking portion includes sections extending along the vertical direction and sections extending along the horizontal direction to form a grid pattern,
    the second position detection electrodes include second position detection electrode segments arranged along the vertical direction at intervals corresponding to dimensions of the pixel portions, and
    the second position detection electrode segments are arranged to overlap the sections of the light blocking portion extending along the horizontal direction.

7. The display device with a position inputting function according to claim 6, wherein the pixel electrodes are arranged on the array board in the display area and connected to the display components, the color filters include color portions arranged on the common board in the display area to overlap the pixel electrodes and each exhibit different colors, the color filters are arranged such that the color portions extend along the vertical direction, cross the sections of the light blocking portion extending along the horizontal direction, and overlap the second position detection electrode segments on the array board side.

8. The display device with a position inputting function according to claim 5, wherein the second position detection electrodes are arranged to overlap the light blocking portion on the array board side.

9. The display device with a position inputting function according to claim 5, wherein the second position detection electrodes are arranged to overlap the light blocking portion on a common board side.

10. The display device with a position inputting function according to claim 9, wherein each of the second position detection electrodes has a multilayer structure of the metal film and a transparent electrode film that is formed over the metal film.

11. The display device with a position inputting function according to claim 9, wherein the position detection lines include ends connected to at least the second position detection electrodes, and each of the ends has a multilayer structure of the metal film and a transparent electrode film that is formed over the metal film.

12. The display device with a position inputting function according to claim 11, further comprising a holding member for holding the common board from a side opposite from the array board side, the holding member being arranged to overlap at least an outer edge portion of the non-display area, wherein the position detection lines include sections that do not overlap the holding member and section that overlap the holding member, each of the sections that do not overlap the holding member has a multilayer structure of the metal film and the transparent electrode film, and each of the sections that overlap the holding member has a single layer structure of the metal film.

13. The display device with a position inputting function according to claim 5, further comprising spacers arranged between the array board and the common board to overlap the light blocking portion and the second position detection electrodes, wherein the light blocking portion and the second position detection electrodes include spacer non-arrangement sections in which no spacers are arranged and spacer arrangement sections in which the spacers are arranged, and each of the spacer arrangement sections has a width larger than a width of each of the spacer non-arrangement sections.

14. The display device with a position inputting function according to claim 1, wherein the second position detection electrodes are arranged in the vertical direction, the position detection lines are connected to the first ends of the second position detection electrodes and arranged along the horizontal direction to extend along the vertical direction, the display device further comprises signal supplying portions in an edge portion of the vertical direction, the signal supplying portions being connected to the position detection lines for supplying the signals, the position detection lines connected to the second position detection electrodes farther from the signal supplying portions with respect to the vertical direction have widths larger than widths of position detection lines connected to the second position detection electrodes closer to the signal supplying portions with respect to the vertical direction.

15. The display device with a position inputting function according to claim 1, further comprising ground electrodes formed from a transparent electrode film on a plate surface of the common board facing away from the array board in the non-display area, wherein the ground electrodes are arranged to overlap the component drivers and the position detection lines.

* * * * *